US012664537B2

(12) United States Patent
Krishnan et al.

(10) Patent No.: US 12,664,537 B2
(45) Date of Patent: Jun. 23, 2026

(54) PROCESSING DATA INTERACTIONS PERFORMED BY AN INTERNET OF THINGS (IoT) DEVICE

(71) Applicant: Bank of America Corporation, Charlotte, NC (US)

(72) Inventors: Subburathinam Krishnan, Chennai (IN); Prabhakaran Balasubramanian, Vellore (IN); Durga Prasad Kutthumolu, Hyderabad (IN); Yugandhar Jaini, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 232 days.

(21) Appl. No.: 18/181,240

(22) Filed: Mar. 9, 2023

(65) Prior Publication Data

US 2024/0303632 A1 Sep. 12, 2024

(51) Int. Cl.
| | |
|---|---|
| *G06Q 20/36* | (2012.01) |
| *G06Q 20/10* | (2012.01) |
| *G06Q 20/30* | (2012.01) |
| *G06Q 20/38* | (2012.01) |
| *G06Q 20/40* | (2012.01) |
| *G16Y 10/50* | (2020.01) |

(52) U.S. Cl.
CPC ......... *G06Q 20/3672* (2013.01); *G06Q 20/10* (2013.01); *G06Q 20/308* (2020.05); *G06Q 20/389* (2013.01); *G06Q 20/4014* (2013.01); *G16Y 10/50* (2020.01)

(58) Field of Classification Search
None
See application file for complete search history.

(56) References Cited

U.S. PATENT DOCUMENTS

| | | | |
|---|---|---|---|
| 10,097,356 B2 | 10/2018 | Zinder | |
| 10,817,852 B2 | 10/2020 | Rangarajan et al. | |
| 10,943,029 B2 | 3/2021 | Marin | |
| 11,164,165 B1 | 11/2021 | Andreev et al. | |
| 11,481,841 B2 | 10/2022 | Robotham | |
| 11,568,393 B2 | 1/2023 | Dalton et al. | |
| 11,836,690 B1 * | 12/2023 | Stroke ................... | H04L 9/3239 |
| 11,888,730 B1 * | 1/2024 | Palermo ................ | G06Q 20/00 |
| 2019/0173854 A1 | 6/2019 | Beck | |
| 2020/0059362 A1 | 2/2020 | Brody et al. | |

(Continued)

OTHER PUBLICATIONS

More Than a Meme: NFTs and the IoT, Article, https://harborresearch.com/more-than-a-meme-nfts-and-the-iot, printed Mar. 10, 2023.

*Primary Examiner* — Chrystina E Zelaskiewicz

(57) ABSTRACT

A processor detects that a first data interaction has been initiated by a first user device associated with a first user. The processor determines whether the first data interaction is to be processed in a first computing network or a second computing network and processes the first data interaction in the determined computing network. After processing the first data interaction, the processor obtains an interaction log associated with the first data interaction, extracts information related to the first data interaction from the interaction log, and transmits the information associated with the first data interaction to a non-fungible token (NFT) blockchain network for recording in a first NFT associated with the first user device.

20 Claims, 6 Drawing Sheets

(56) References Cited

U.S. PATENT DOCUMENTS

| | | | |
|---|---|---|---|
| 2020/0119906 A1 | 4/2020 | Das et al. | |
| 2021/0150626 A1 | 5/2021 | Robotham | |
| 2021/0271508 A1* | 9/2021 | Lee | G06Q 20/405 |
| 2021/0272114 A1 | 9/2021 | Kita et al. | |
| 2021/0357927 A1 | 11/2021 | Kita et al. | |
| 2022/0004539 A1 | 1/2022 | Caro et al. | |
| 2022/0044316 A1 | 2/2022 | Gaur et al. | |
| 2022/0050982 A1 | 2/2022 | Spivack et al. | |
| 2022/0069996 A1 | 3/2022 | Xue et al. | |
| 2022/0103453 A1 | 3/2022 | Novotny et al. | |
| 2022/0150050 A1 | 5/2022 | Gundavelli et al. | |
| 2022/0271915 A1 | 8/2022 | Turner et al. | |
| 2022/0337439 A1 | 10/2022 | McCoy | |
| 2022/0366061 A1 | 11/2022 | Spivack et al. | |
| 2023/0086644 A1* | 3/2023 | Jakobsson | G06Q 20/367 |
| | | | 705/65 |
| 2024/0062178 A1* | 2/2024 | McDonnell | A63B 69/3632 |
| 2024/0073027 A1* | 2/2024 | Dubuque | G06K 19/07762 |

* cited by examiner

200 ⌐⟍

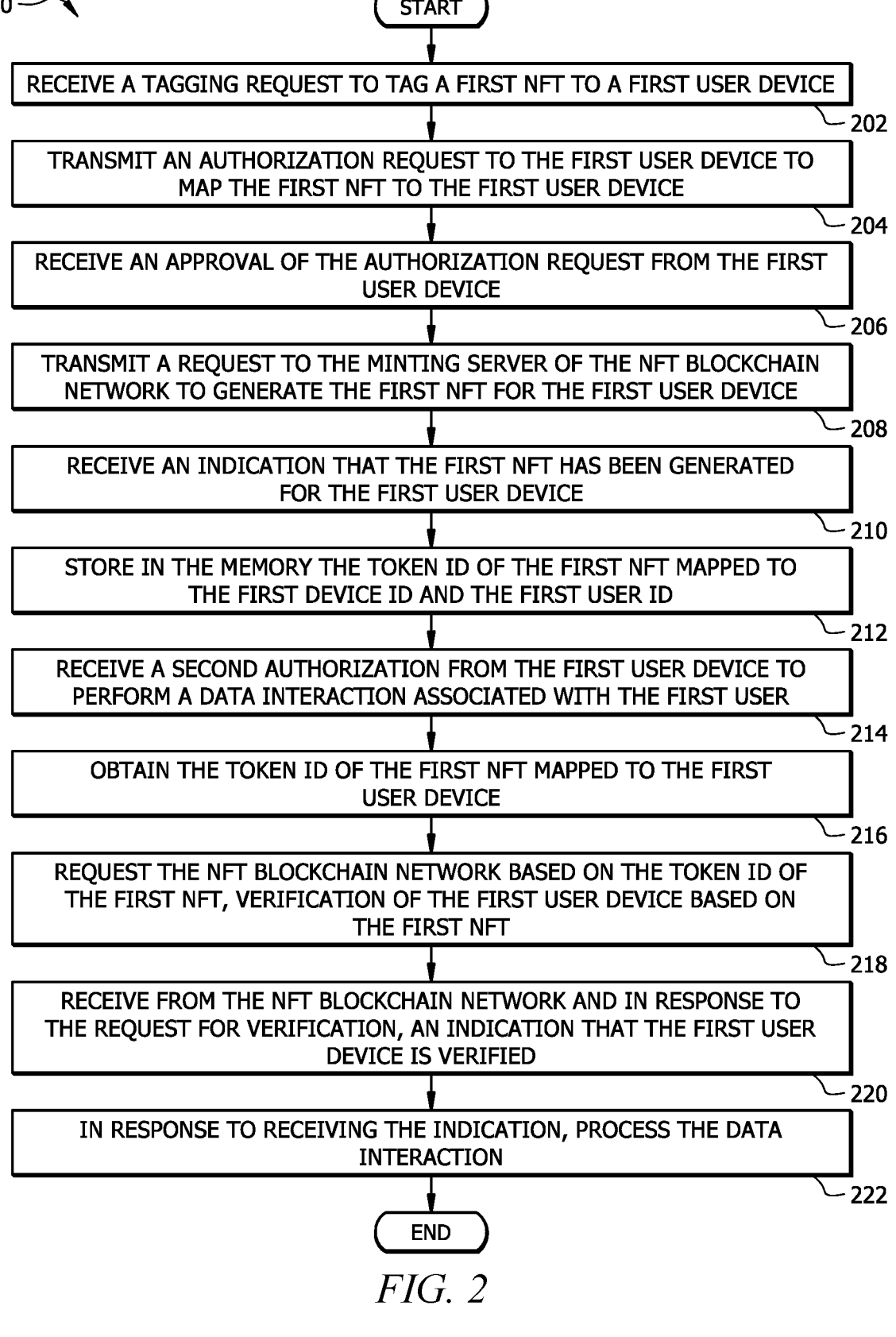

START

RECEIVE A TAGGING REQUEST TO TAG A FIRST NFT TO A FIRST USER DEVICE

⟍— 202

TRANSMIT AN AUTHORIZATION REQUEST TO THE FIRST USER DEVICE TO MAP THE FIRST NFT TO THE FIRST USER DEVICE

⟍— 204

RECEIVE AN APPROVAL OF THE AUTHORIZATION REQUEST FROM THE FIRST USER DEVICE

⟍— 206

TRANSMIT A REQUEST TO THE MINTING SERVER OF THE NFT BLOCKCHAIN NETWORK TO GENERATE THE FIRST NFT FOR THE FIRST USER DEVICE

⟍— 208

RECEIVE AN INDICATION THAT THE FIRST NFT HAS BEEN GENERATED FOR THE FIRST USER DEVICE

⟍— 210

STORE IN THE MEMORY THE TOKEN ID OF THE FIRST NFT MAPPED TO THE FIRST DEVICE ID AND THE FIRST USER ID

⟍— 212

RECEIVE A SECOND AUTHORIZATION FROM THE FIRST USER DEVICE TO PERFORM A DATA INTERACTION ASSOCIATED WITH THE FIRST USER

⟍— 214

OBTAIN THE TOKEN ID OF THE FIRST NFT MAPPED TO THE FIRST USER DEVICE

⟍— 216

REQUEST THE NFT BLOCKCHAIN NETWORK BASED ON THE TOKEN ID OF THE FIRST NFT, VERIFICATION OF THE FIRST USER DEVICE BASED ON THE FIRST NFT

⟍— 218

RECEIVE FROM THE NFT BLOCKCHAIN NETWORK AND IN RESPONSE TO THE REQUEST FOR VERIFICATION, AN INDICATION THAT THE FIRST USER DEVICE IS VERIFIED

⟍— 220

IN RESPONSE TO RECEIVING THE INDICATION, PROCESS THE DATA INTERACTION

⟍— 222

END

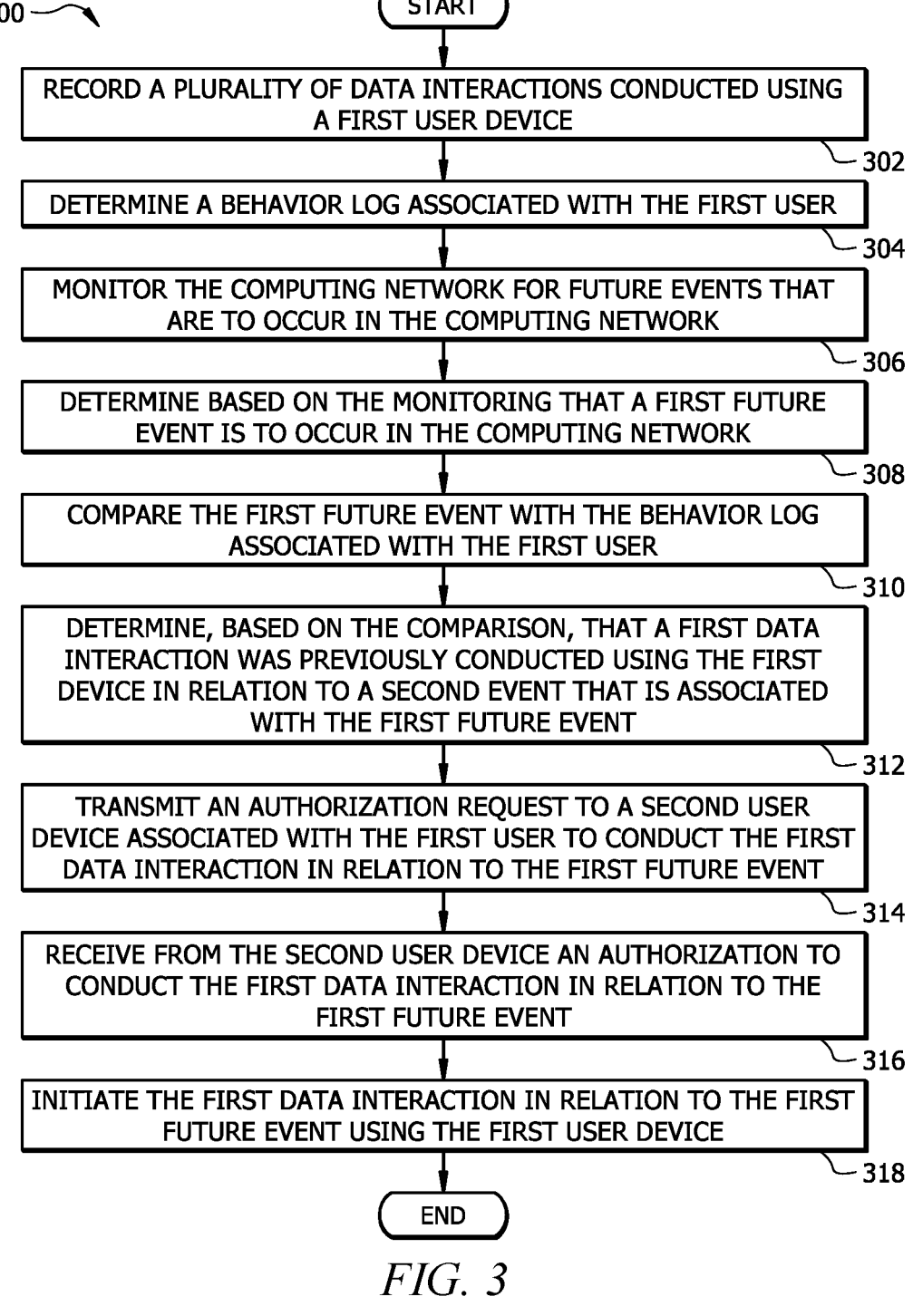

START

RECORD A PLURALITY OF DATA INTERACTIONS CONDUCTED USING A FIRST USER DEVICE

302

DETERMINE A BEHAVIOR LOG ASSOCIATED WITH THE FIRST USER

304

MONITOR THE COMPUTING NETWORK FOR FUTURE EVENTS THAT ARE TO OCCUR IN THE COMPUTING NETWORK

306

DETERMINE BASED ON THE MONITORING THAT A FIRST FUTURE EVENT IS TO OCCUR IN THE COMPUTING NETWORK

308

COMPARE THE FIRST FUTURE EVENT WITH THE BEHAVIOR LOG ASSOCIATED WITH THE FIRST USER

310

DETERMINE, BASED ON THE COMPARISON, THAT A FIRST DATA INTERACTION WAS PREVIOUSLY CONDUCTED USING THE FIRST DEVICE IN RELATION TO A SECOND EVENT THAT IS ASSOCIATED WITH THE FIRST FUTURE EVENT

312

TRANSMIT AN AUTHORIZATION REQUEST TO A SECOND USER DEVICE ASSOCIATED WITH THE FIRST USER TO CONDUCT THE FIRST DATA INTERACTION IN RELATION TO THE FIRST FUTURE EVENT

314

RECEIVE FROM THE SECOND USER DEVICE AN AUTHORIZATION TO CONDUCT THE FIRST DATA INTERACTION IN RELATION TO THE FIRST FUTURE EVENT

316

INITIATE THE FIRST DATA INTERACTION IN RELATION TO THE FIRST FUTURE EVENT USING THE FIRST USER DEVICE

318

END

*FIG. 3*

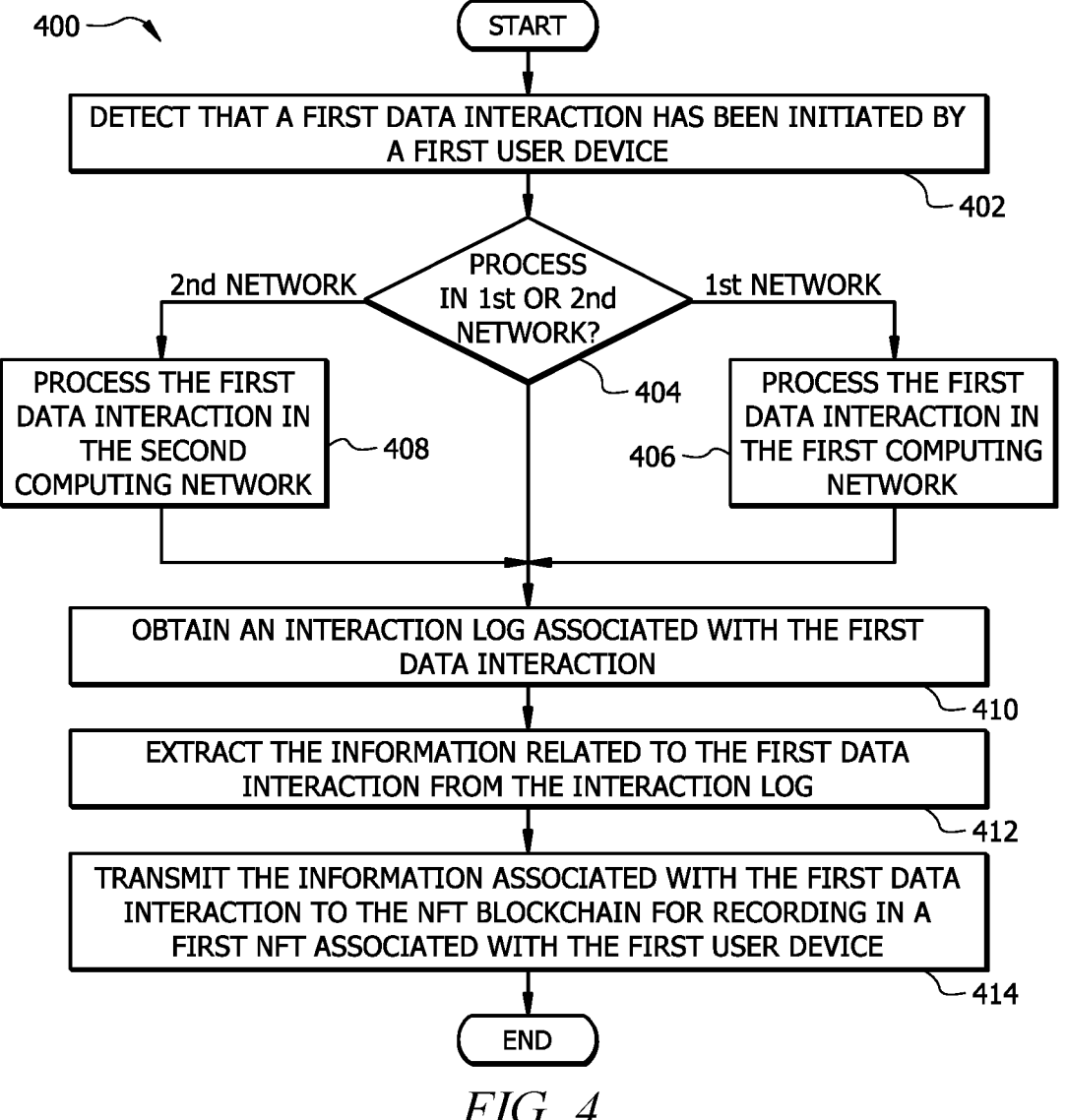

400

START

DETECT THAT A FIRST DATA INTERACTION HAS BEEN INITIATED BY A FIRST USER DEVICE

402

PROCESS IN 1st OR 2nd NETWORK?

404

2nd NETWORK

1st NETWORK

PROCESS THE FIRST DATA INTERACTION IN THE SECOND COMPUTING NETWORK

408

406

PROCESS THE FIRST DATA INTERACTION IN THE FIRST COMPUTING NETWORK

OBTAIN AN INTERACTION LOG ASSOCIATED WITH THE FIRST DATA INTERACTION

410

EXTRACT THE INFORMATION RELATED TO THE FIRST DATA INTERACTION FROM THE INTERACTION LOG

412

TRANSMIT THE INFORMATION ASSOCIATED WITH THE FIRST DATA INTERACTION TO THE NFT BLOCKCHAIN FOR RECORDING IN A FIRST NFT ASSOCIATED WITH THE FIRST USER DEVICE

414

END

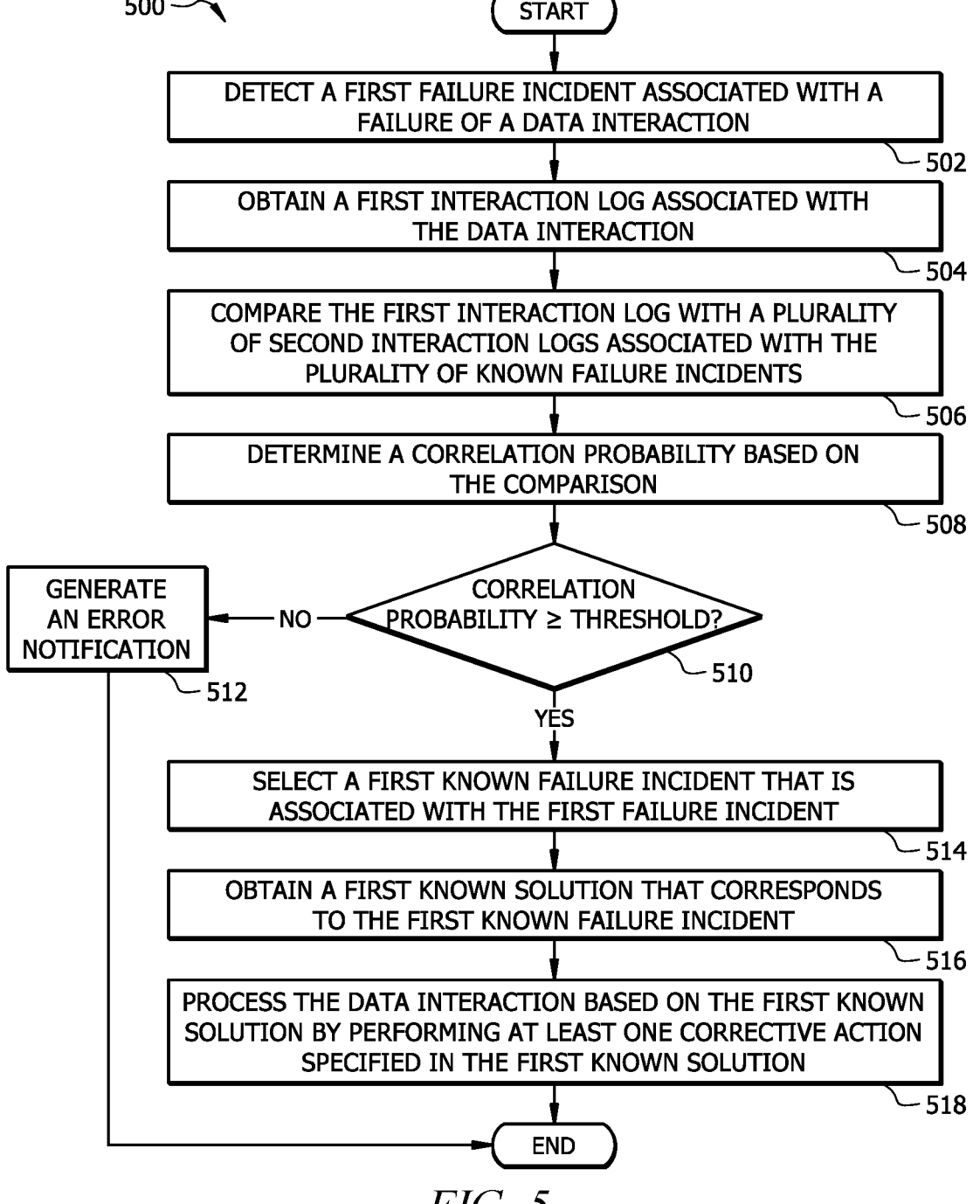

START

DETECT A FIRST FAILURE INCIDENT ASSOCIATED WITH A
FAILURE OF A DATA INTERACTION
502

OBTAIN A FIRST INTERACTION LOG ASSOCIATED WITH
THE DATA INTERACTION
504

COMPARE THE FIRST INTERACTION LOG WITH A PLURALITY
OF SECOND INTERACTION LOGS ASSOCIATED WITH THE
PLURALITY OF KNOWN FAILURE INCIDENTS
506

DETERMINE A CORRELATION PROBABILITY BASED ON
THE COMPARISON
508

CORRELATION
PROBABILITY ≥ THRESHOLD?
510

GENERATE
AN ERROR
NOTIFICATION
512

NO

YES

SELECT A FIRST KNOWN FAILURE INCIDENT THAT IS
ASSOCIATED WITH THE FIRST FAILURE INCIDENT
514

OBTAIN A FIRST KNOWN SOLUTION THAT CORRESPONDS
TO THE FIRST KNOWN FAILURE INCIDENT
516

PROCESS THE DATA INTERACTION BASED ON THE FIRST KNOWN
SOLUTION BY PERFORMING AT LEAST ONE CORRECTIVE ACTION
SPECIFIED IN THE FIRST KNOWN SOLUTION
518

END

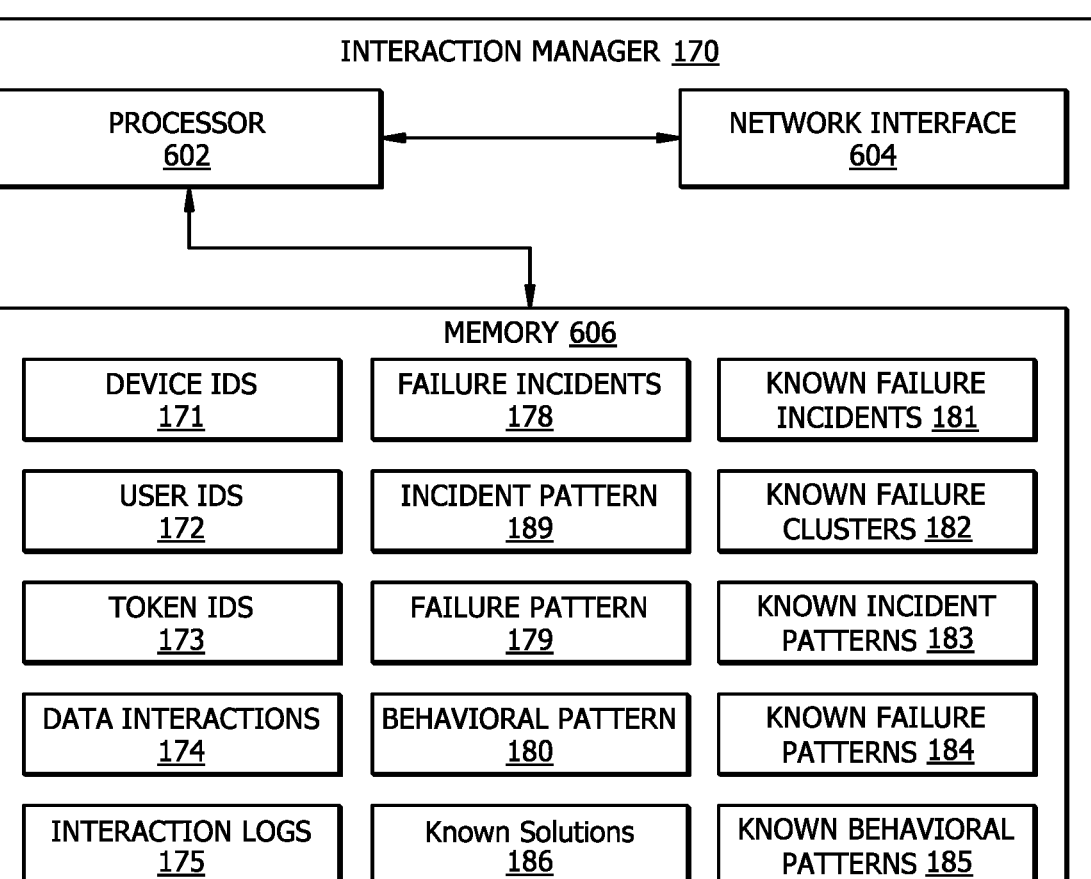

INTERACTION MANAGER 170

PROCESSOR
602

NETWORK INTERFACE
604

MEMORY 606

DEVICE IDS
171

USER IDS
172

TOKEN IDS
173

DATA INTERACTIONS
174

INTERACTION LOGS
175

BEHAVIOR LOGS
176

MACHINE LEARNING
MODEL 177

FAILURE INCIDENTS
178

INCIDENT PATTERN
189

FAILURE PATTERN
179

BEHAVIORAL PATTERN
180

Known Solutions
186

CORRELATION
PROBABILITY 187

THRESHOLD
PROBABILITY 188

KNOWN FAILURE
INCIDENTS 181

KNOWN FAILURE
CLUSTERS 182

KNOWN INCIDENT
PATTERNS 183

KNOWN FAILURE
PATTERNS 184

KNOWN BEHAVIORAL
PATTERNS 185

INTERACTION
MANAGER
INSTRUCTIONS 608

*FIG. 6*

PROCESSING DATA INTERACTIONS PERFORMED BY AN INTERNET OF THINGS (IoT) DEVICE

TECHNICAL FIELD

The present disclosure relates generally to data processing, and more specifically to Processing data interactions performed by an Internet of Things (IoT) device.

BACKGROUND

Data interactions performed using internet of things (IoT) devices are becoming increasingly popular. Generally, IoT devices such as smart sensors are simple computing devices with limited memory and processing capabilities. Thus, it is often challenging to implement robust cyber security protocols in the IoT devices, which make them vulnerable to cyber-attacks. Thus, data interactions performed by an IoT device are generally vulnerable to cyber-attacks that may result in data theft. Further, when a user sets up an IoT device to automatically perform data interactions with little to no human intervention, this makes any potential attacks difficult to detect which makes the IoT devices even more vulnerable.

SUMMARY

The system and method implemented by the system as disclosed in the present disclosure provide technical solutions to the technical problems discussed above by providing secure data interactions performed by IoT devices.

For example, the disclosed system and methods provide the practical application of securing data interactions performed by an IoT device using non-fungible tokens (NFT). As described in embodiments of the present disclosure, an interaction manager maps an NFT to an IoT device. The interaction manager generates an NFT in relation to the IoT device using a minting server of an NFT blockchain network that is configured to generate NFTs. For example, the interaction manager sends a request to the minting server to generate the NFT for the IoT device. Once generated, the NFT includes at least a unique token ID of the NFT, a device ID associated with the IoT device, and a user ID associated with the user who owns the IoT device. Once generated and mapped to the IoT device, the NFT is used to authenticate the identity of the IoT device when the IoT device initiates data interactions in a centralized network and/or a decentralized network on behalf of the user. For example, in response to receiving an authorization from the IoT device to perform a data interaction associated with the user, interaction manager obtains the token ID of the NFT mapped to the IoT device and requests the NFT blockchain network to verify the identity of the IoT device based on the token ID. A computing node of the NFT blockchain network may verify the identity of the IoT device by accessing the NFT based on the token ID received from the interaction manager and verifying that the token ID is associated with the device ID of the IoT device in the NFT. Upon successfully verifying the identity of the IoT device, the interaction manager is notified of the successful verification. Interaction manager initiates processing of the data interaction authorized by the IoT device only upon receiving a notification from the NFT blockchain network that the IoT device is verified. This allows the system to certify that it is the authorized IoT device and not some unauthorized entity that is attempting to perform the data interaction on behalf of the user. This greatly reduces the possibility of bad actors tampering with a data interaction initiated and/or performed by an IoT device and improves data and network security in computing infrastructures.

The disclosed system and method provide an additional practical application of resolving failed data interactions performed using IoT devices. In response to detecting a failure incident associated with a failure of a data interaction, the interaction manager determines a known solution that was previously used to resolve a same or similar failure incident. The interaction manager re-processes the failed data interaction by performing at least one corrective action specified in the determined known solution. The interaction manager follows a multi-tiered approach to search a known solution in relation to the detected failure incident. In a first step, the interaction manager compares an interaction log of the failed data interaction with a plurality of interaction logs associated with a plurality of known failure incidents. The interaction manager determines a correlation probability based on the comparison, wherein the correlation probability indicates a degree of similarity between contexts associated with the interaction log of the failed data interaction and the interaction logs of the known failure incidents. The comparison of the interaction logs is a relatively high-level comparison and helps determine whether a contextual match exists between the detected failure incident and at least a portion of the known failure incident. The interaction manager proceeds to the next level of the search process only when the determined correlation probability equals or exceeds a threshold. This ensures that computing resources are not wasted in performing a deep search for known solutions when no contextual match exists between the detected failure incident and the known failure incidents.

When the determined correlation probability equals or exceeds the threshold, interaction manager proceeds to the next levels of the search process. As described in embodiments of the present disclosure, to increase the speed with which a known solution is found in relation to a failure incident, interaction manager may be configured to classify the known failure incidents into several categories (e.g., known failure clusters) and sub-categories (e.g., known incident patterns). This allows the interaction manager to identify a category and sub-category that relates to a failure incident, and search for a known failure incident and corresponding known solution in the identified category and sub-category only. This significantly increases the speed with which a known solution is found in relation to the failure incident. In this context, the interaction manager determines a plurality of known failure clusters of the known failure incidents, wherein each known failure cluster corresponds to a failure type of a plurality of failure types. Interaction manager further classifies known failure incidents in each known failure cluster based on incident patterns associated with the known failure incidents. Interaction manager first identifies a known failure cluster that matches the failure type of the detected failure incident and searches for known failure incidents within the identified cluster only. By following this multi-tiered approach to searching for a known solution to a failure incident, the disclosed system and method improve the processing speed of the processors implementing this search.

Thus, the disclosed system and method generally improve the technology associated with performing data interactions in a computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a flowchart of an example method for performing secure data interactions using an IoT device, in accordance with one or more embodiments of the present disclosure;

FIG. 3 illustrates a flowchart of an example method for selecting data interactions to be performed by an IoT device, in accordance with one or more embodiments of the present disclosure;

FIG. 4 illustrates a flowchart of an example method for processing data interactions performed by an IoT device, in accordance with one or more embodiments of the present disclosure;

FIG. 5 illustrates a flowchart of an example method for resolving failed data interactions performed by an IoT device, in accordance with one or more embodiments of the present disclosure; and FIG. 6 illustrates an example schematic diagram of the interaction manager shown in FIG. 1, in accordance with one or more aspects of the present disclosure.

DETAILED DESCRIPTION

Figure 1:
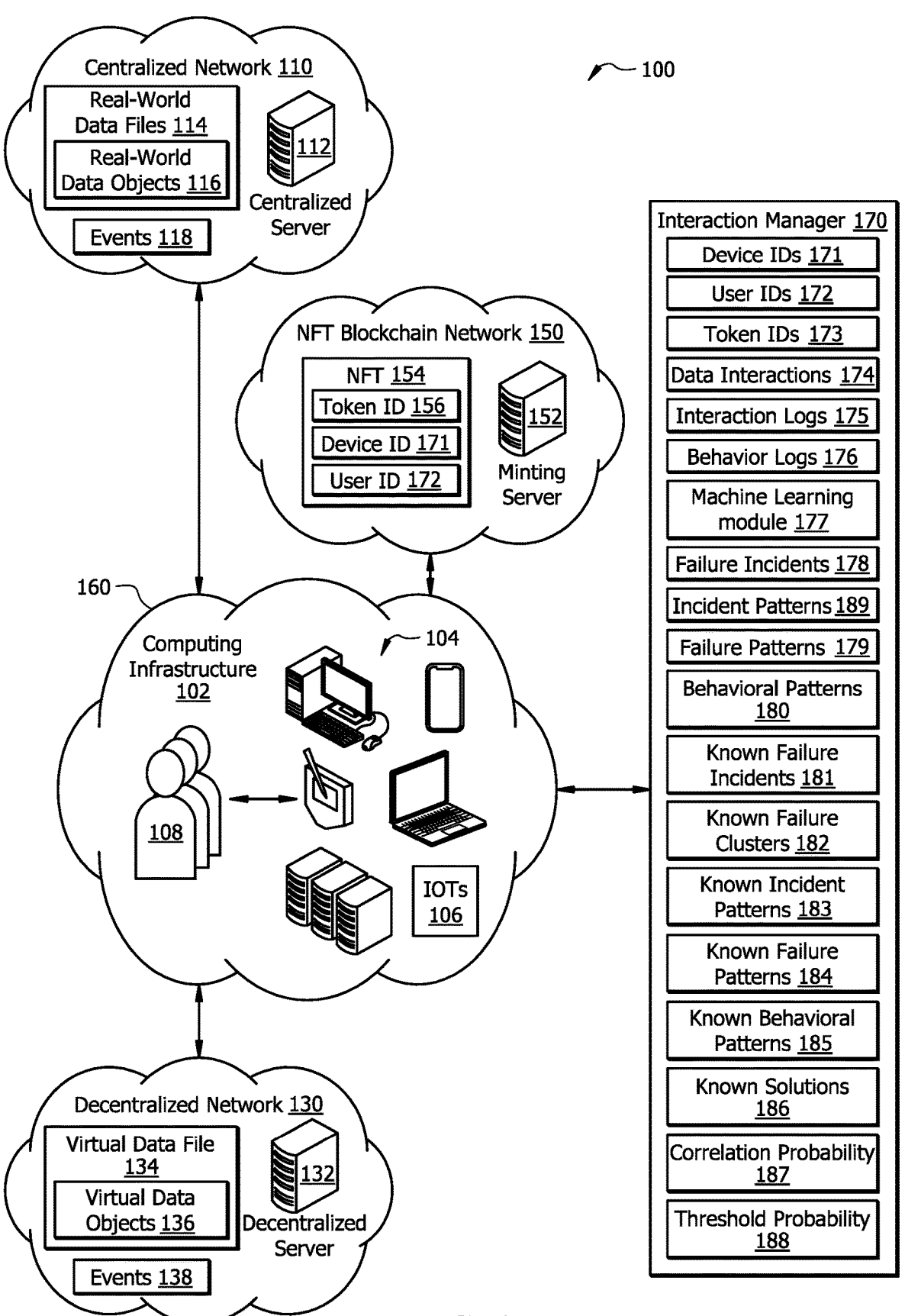
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 160. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 160. In certain embodiments, computing nodes 104 may include Internet of Things (IoT) devices 106 that are capable of performing data interactions without human intervention. Software components may include software applications that are run by one or more of the computing nodes 104 including, but not limited to, operating systems, user interface applications, third party software, database management software, service management software, metaverse software and other customized software programs implementing particular functionalities. For example, software code relating to one or more software applications may be stored in a memory device and one or more processors may process the software code to implement respective functionalities. In one embodiment, at least a portion of the computing infrastructure 102 may be representative of an Information Technology (IT) infrastructure of an organization.

One or more of the computing nodes 104 may be operated by a user 108. For example, a computing node 104 may provide a user interface using which a user 108 may operate the computing node 104 to perform data interactions within the computing infrastructure 102.

One or more computing nodes 104 of the computing infrastructure 102 may be representative of a computing system hosting software applications that may be installed and run locally or may be used to access software applications running on a server (e.g., centralized server 112). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server (e.g., centralized server 112) running one or more software applications to implement respective functionality as described below. In certain embodiments, one or more of the computing nodes 104 may run a thin client software application where the processing is directed by the thin client but largely performed by a central entity such as a server (not shown).

Network 160, in general, may be a wide area network (WAN), a personal area network (PAN), a cellular network, or any other technology that allows devices to communicate electronically with other devices. In one or more embodiments, network 160 may be the Internet.

At least a portion of the computing nodes 104 of the computing infrastructure 102 may be part of a centralized computing network 110 (also referred to as centralized network 110). Data interactions performed in the centralized network 110 are generally managed by a central computing entity such as a centralized server 112 that is part of the centralized network 110. In one embodiment, the centralized server 112 is a computing node 104 of the computing infrastructure 102. The centralized server 112 is a single authority that controls the centralized network 110 and is responsible for processing most data interactions 174 conducted within the centralized network 110. For example, most traditional IT infrastructures implement some form of the centralized network 110. The centralized server 112 may be configured to store real-world data files 114 registered for users 108 of the centralized network 110. In one or more embodiments, as a user 108 initially registers with the centralized server 112, the centralized server 112 may collect several pieces of information from the user 108 including information relating to the identity of the user 108 such as legal name, biometrics (e.g., fingerprints, retina scans, face ID etc.), residence address, phone numbers, assets owned by the user, and copies of government issued documents (e.g., drivers permit, state identity card etc.). This information is stored by centralized server 112 as part of a user profile of the user 108. In one embodiment, at least a portion of the information relating to the user 108 collected by the centralized server 112 may be stored by the interaction manager 170. Once the identity of the user 108 is confirmed and all other information provided by the user 108 is verified to be correct, the centralized server 112 may generate a real-world data file 114 for the user 108 in which the user 108 may store real-world data objects 116 owned by the user 108. In addition, centralized server 112 allows the user 108 to generate a user credential (e.g., username and password) that allows the user 108 to login to the centralized server 112 and perform data interactions 174 within the centralized network 110.

Information relating to the real-world data file 114 of the user 108 may be stored as part of the user profile of the user 108. This information may include, but is not limited to, an identity (e.g., unique name or number) of the real-world data file 114, an identity of the user 108 (e.g., user ID 172) who owns the real-world data file 114, an amount of real-world data objects 116 stored in the real-world data file 114, a log of data interactions (e.g., interaction log 175) conducted in relation to the real-world data file 114 and any other information relating to the real-world data file 114. Once registered with the centralized server 112, the centralized server 112 may allow the user 108 to perform one or more data interactions 174 within the centralized network 110. For example, a data interaction 174 conducted in the centralized network 110 may include transferring one or more real-world data objects 116 from the real-world data file 114 of the user 108 to a second real-world data file (not shown) of a second user 108 or another entity. Another example data interaction 174 may include receiving one or more real-world data objects 116 in the real-world data file 114 of the user 108 from the second real-world data file of the second user 108 or another entity. Another example data interaction may include requesting by a first user 108 transfer of real-world data objects 116 from a real-world data file 114 of a second user 108 to a real-world data file 114 of a third user 108 as part of satisfying an agreement between the first user 108 and the third user 108. It may be noted that a data interaction 174 in accordance with embodiments of the present disclosure refers to any interaction that includes transfer of data between computing nodes 104 of the computing infrastructure 102.

In one or more embodiments, the centralized server 112 may register one or more computing nodes 104 for the user 108. These computing nodes 104 may include devices operable by the user 108 including, but not limited to, desktop computers, laptop computers, tablet computers, and smart phones. Once registered, the user 108 may use the one or more computing nodes 104 to perform data interactions 174 (e.g., data interactions related to the real-world data file 114) in the centralized network 110. In one embodiment, the computing nodes 104 registered by the user 108 may include IoT devices 106 associated with the user 108 such as smart sensors, smart meters, smart cameras, smart home appliances and the like. The user 108 may register one or more IoT devices 106 to automatically initiate data interactions 174 (e.g., data interactions relating to the real-world data file 114) in the centralized network 110 without intervention by the user 108. For example, the user 108 may setup an IoT device 106 to automatically initiate transfer of real-world data objects 116 from the real-world data file 114 to a target real-world data file 114 in relation to a past event 118 that occurred or future event 118 that is to occur in the centralized network 110. The centralized server 112 may be configured to generate a unique user ID 172 for each user 108 registered to perform data interactions 174 within the centralized network 110. Additionally, the centralized server 112 may be configured to generate a unique device ID 171 for each computing node 104 (e.g., IoT device 106) registered for the user 108. The centralized server 112 may be configured to associate the device ID 172 of each registered computing node 104 of the user 108 with the user ID 172 of the user 108. The centralized server 112 may be configured to store as part of the user profile of the user 108, the device IDs 171 of all computing nodes 104 (e.g., IoT devices 106) registered for the user 108 mapped to the user ID 172 of the user 108.

At least a portion of the computing nodes 104 of the computing infrastructure 102 may be part of a decentralized computing network 130 (also referred to as decentralized network 130). Data interactions performed in the decentralized network 130 generally are collectively managed by a plurality of computing nodes 102 that are part of the decentralized network 130. Unlike centralized network 110, there is no single entity controlling the decentralized network 130. Instead, the work and responsibility are shared by many computing nodes 104. The major difference between the centralized network 110 and the decentralized network 130 is who controls the network. With the centralized network 110, one central authority (e.g., centralized server 112) has total control of the network. Decentralized systems, on the other hand, are controlled by multiple entities, and no single person can tamper with and do what they want with the network. Once example of the decentralized network 130 is a public blockchain network. A blockchain network implements a blockchain which generally is an open, decentralized and distributed digital ledger consisting of records called blocks that are used to record data interactions 174 across many computing nodes (e.g., computing nodes 104). Each computing node 104 of a blockchain network (e.g., decentralized network 130) may maintain a copy of the blockchain ledger. Logically, a blockchain is a chain of blocks which contains specific information. Once recorded, the data in any given block cannot be altered retroactively without alteration of all subsequent blocks, which requires consensus of the network majority. Each computing node 104 within the blockchain network maintains, approves, and updates new entries. The system is controlled not only by separate individuals, but by everyone within the blockchain network. Each member ensures that all records and procedures are in order, which results in data validity and security. Thus, the distributed ledger can record data interactions between two parties (e.g., users 108) efficiently and in a verifiable and permanent way. By design, a blockchain network is resistant to modification of the data. For use as a distributed ledger, a blockchain is typically managed by a peer-to-peer network collectively adhering to a protocol for inter-node communication and validating new blocks. Several computing nodes 104 that are part of the blockchain network may store a copy of the blockchain ledger of the blockchain network, wherein each copy of the blockchain ledger includes a copy of the blockchain associated with the blockchain network.

In one or more embodiments, a user 108 may register with a decentralized server 132 that may be part of the decentralized network 130. In one embodiment, the decentralized server 132 is a computing node 104 of the computing infrastructure 102. The decentralized server 132 may be configured to register users 108 for performing data interactions within the decentralized network 130. When initially registering with the decentralized server 132, the decentralized server 132 may collect several pieces of information from the user 108 including information relating to the identity of the user 108 such as legal name, biometrics (e.g., fingerprints, retina scans, face ID etc.), residence address, phone numbers, assets owned by the user, and copies of government issued documents (e.g., drivers permit, state identity card etc.). This information is stored by decentralized server 132 as part of a user profile of the user 108. In one embodiment, at least a portion of the information relating to the user 108 collected by the decentralized server 132 may be stored by the interaction manager 170. Once the identity of the user 108 is confirmed and all other information provided by the user 108 is verified to be correct, the decentralized server 132 may generate a virtual data file 134 for the user 108 in which the user 108 may store virtual data objects 136 owned by the user 108. In addition, decentralized server 132 allows the user 108 to generate a user credential (e.g., username and password) that allows the user 108 to access the decentralized network 130 and perform data interactions 174 within the decentralized network 130.

In one or more embodiments, the virtual data file 134 of the user 108 is associated with the real-world data file 114 of the user 108. For example, the virtual data file 134 is a virtual image of the real-world data file 114, wherein the virtual data objects 136 correspond to the real-world data objects 116. In other words, the virtual data file 134 is a virtual representation of the real-world data file 114. In another example, the virtual data file 134 stores a portion of the real-world data objects 116 in the form of virtual data objects 136. In another example, real-world data objects 116 may be converted to virtual data objects 136, and vice versa. In this case, there may not be a one-to-one conversion between the real-world data objects 116 and virtual data objects 136. For example, one real-world data object 116 may be converted to a plurality of virtual data objects 136, wherein the conversion ratio may dynamically change from time to time. In one embodiment, when the centralized network 110 and the decentralized network 130 are owned and/or managed by the same entity or organization, the user 108 may use a same user credential to login to the centralized server 112 as well as the decentralized server 132. In certain embodiments, when the centralized network 110 and the decentralized network 130 are owned and/or managed by different entities, user 108 may separately register with one of the centralized server 112 and the decentralized server 132 without registering with the other. In this case the user typically generates separate user credentials to access the centralized network 110 and the decentralized network 130.

Information relating to the virtual data file 134 of the user 108 may be stored by the decentralized server 132 as part of a user profile of the user 108 stored at the decentralized server 132. This information may include, but is not limited to, an identity of the virtual data file 134, an identity of the user 108 (e.g., user id 172) who owns the virtual data file 134, amount of virtual data objects 136 stored in the virtual data file 134, a log of virtual data interactions (e.g., interaction log 175) conducted in the decentralized network 130 in relation to the virtual data file 134 and any other information relating to the virtual data file 134. In one embodiment, information relating to the virtual data files 134 and respective virtual data objects 136 is stored in a distributed manner across several computing nodes of the decentralized network 130. In one example, when the decentralized network 130 is a blockchain network, information relating to the virtual data files 134 and respective virtual data objects 136 is stored in the distributed ledger of the blockchain network.

Once registered with the decentralized server 132, the decentralized server 132 may allow the user 108 to perform one or more data interactions 174 within the decentralized network 130. For example, a data interaction 174 conducted in the decentralized network 130 may include transferring one or more virtual data objects 136 from the virtual data file 134 of the user 108 to a second virtual data file 134 (not shown) of a second user 108 or another entity. Another example data interaction may include receiving one or more virtual data objects 136 in the virtual data file 134 of the user 108 from the second virtual data file 134 of the second user 108 or another entity. Another example data interaction may include requesting by a first user 108 transfer of virtual data objects 136 from a virtual data file 134 of a second user 108 to a virtual data file 134 of a third user 108 as part of satisfying an agreement between the first user 108 and the third user 108.

In one or more embodiments, the decentralized server 132 may register one or more computing nodes 104 for the user 108. These computing nodes 104 may include devices operable by the user 108 including, but not limited to, desktop computers, laptop computers, tablet computers, and smart phones. Once registered, the user 108 may use the one or more computing nodes 104 to perform data interactions 174 (e.g., data interactions related to the virtual data file 134) in the decentralized network 130. In one embodiment, the computing nodes 104 registered by the user 108 may include IoT devices 106 associated with the user 108 such as smart sensors, smart meters, smart cameras, smart home appliances and the like. The user 108 may register one or more IoT devices 106 to automatically initiate data interactions 174 (e.g., data interactions relating to the virtual data file 134) in the decentralized network 130 without intervention by the user 108. For example, the user 108 may setup an IoT device 106 to automatically initiate transfer of virtual data objects 136 from the virtual data file 134 to a target virtual data file 134 in relation to a past event 138 that occurred or future event 138 that is to occur in the decentralized network 130. The decentralized server 132 may be configured to generate a unique user ID 172 for each user 108 registered to perform data interactions 174 within the decentralized network 130. Additionally, the decentralized server 132 may be configured to generate a unique device ID 171 for each computing node 104 (e.g., IoT device 106) registered for the user 108. The decentralized server 132 may be configured to associate the device ID 172 of each registered computing node 104 of the user 108 with the user ID 172 of the user 108. The decentralized server 132 may be configured to store as part of the user profile of the user 108, the device IDs 171 of all computing nodes 104 (e.g., IoT devices 106) registered for the user 108 mapped to the user ID 172 of the user 108.

In one or more embodiments, the virtual data file 134 is a software application running on a computing node 104 owned and/or operated by the respective user (e.g., user 108). For example, when a first user 108 desires to receive virtual data objects 136 from a virtual data file 134 of a second user 108, the first user 108 may direct the second user 108 to a unique cryptographic address (e.g., public key) issued by the virtual data file 134. In one embodiment, the virtual data file 134 may not itself store the virtual data objects 136 but may store information that points to a location of the virtual data objects 136, for example, on a server. Virtual data file 134 may be web-based or hardware-based. For example, virtual data file 134 may be stored in a mobile device or a desktop computer connected to the internet. Additionally or alternatively, virtual data file 134 may be stored in a device (e.g., USB drive) that is not connected to the network 160.

At least a portion of the computing nodes 104 of the computing infrastructure 102 may be part of a Non-Fungible Token (NFT) blockchain network 150, which is a blockchain network configured to generate NFTs 154. Each NFT 154 generated by the NFT blockchain network 150 is a blockchain based digital certificate that uniquely identifies a digital asset and thus acts as verifiable proof of ownership of the digital asset. An NFT 154 may be generated for a particular digital asset and includes information relating to the digital asset, and further includes a unique digital signature that cannot be changed as NFTs are stored in a distributed network such as a blockchain. Using a native digital signature scheme on the NFT blockchain network 150, it is easy to verify the authenticity of each NFT 154, its identity, its unique attributes, and its owner. Since NFTs cannot be modified easily, this greatly reduces the possibility of bad actors tampering with the NFT. As described in more detail below, system 100 and methods implemented by the system 100 in embodiments of the present disclosure leverage NFT technology to verify identity (e.g., user id 172) of computing nodes 104 such as IoT devices 106 that perform data interactions within the centralized network 110 and/or decentralized network 130. Further, NFTs are used to securely perform data interactions 174 within these networks. For example, by recording information relating to a data interaction in an NFT in a verifiable and immutable manner, the system and method disclosed herein avoid tampering of the data interaction by a malicious entity.

An NFT may be generated through a process called minting. Minting is a process that involves signing a blockchain transaction in the NFT blockchain network 150 that outlines the fundamental token details, which is then broadcasted to the blockchain to trigger a smart contract function which creates the token and assigns it to its owner (e.g., user 108). This minting process may be performed by a minting server 152 of the NFT blockchain network 150. An NFT 154 generated by the NFT blockchain network 150 (e.g., by the minting server 152) generally includes a unique token ID 156 of the NFT 154 and other information related to a computing node 104 (e.g., IoT device 106) and/or data interaction 174 as described in more detail below. For example, an NFT includes a unique token ID 173 mapped to a user ID 172 of a user 108 who owns the NFT and in some cases a device ID 171 of an IoT device 106 registered to perform data interactions 174 for the user 108. The token ID 173 mapped to the user ID 172 and one or more device IDs 171 is generally stored in a smart contract.

In one or more embodiments, one or more computing nodes 104 of the computing infrastructure 102 may implement an interaction manager 170 and respective operations performed by the interaction manager 170 described in embodiments of the present disclosure. It may be noted that certain operations performed by the interaction manager 170 may be implemented by computing nodes 104 that are part of the centralized network 110, the decentralized network 130, the NFT blockchain network 150 or combinations thereof. In other words, the interaction manager 170 or a portion thereof may be implemented by one or more computing nodes 104 that are part of the centralized network 110, the decentralized network 130, the NFT blockchain network 150 or combinations thereof.

Securing Data Interactions Performed by an Internet of Things (IoT) Device Using NFT Generally, IoT devices 106 such as smart sensors are simple computing devices with limited memory and processing capabilities. Thus, it is often challenging to implement robust cyber security protocols in the IoT devices 106 which make them vulnerable to cyber-attacks. Thus, data interactions 174 (e.g., data interactions related to a real-world data file 114 or virtual data file 134) performed by an IoT device 106 are generally vulnerable to cyber-attacks that may result in data theft. Further, when a user 108 sets up an IoT device 106 to automatically perform data interactions 174 (e.g., data interactions related to a real-world data file 114 or virtual data file 134) with little to no human intervention, this makes any potential attacks difficult to detect in real-time which makes the IoT devices even more vulnerable.

Embodiments of the present disclosure discuss techniques for securing data interactions performed by an IoT device 106 by leveraging NFT technology. As described above, an NFT 154 generated for a particular digital asset includes information relating to the digital asset, and further includes a unique digital signature that cannot be changed as NFTs are stored in a distributed network such as a blockchain. Using a native digital signature scheme on the NFT blockchain network 150, it is easy to verify the authenticity of each NFT 154, its identity, its unique attributes, and its owner. As described in further detail below, this immutable and verifiable property of the NFT 154 may be used to authenticate identity of IoT devices 106 in relation to data interactions 174 initiated by the IoT devices 106. An NFT 154 may be generated and tagged (e.g., associated/mapped) to an IoT device 106, wherein the NFT 154 associated with a particular IoT device 106 can be used to authenticate the identity of the IoT device 106 when the IoT device 106 is used to initiate data interactions 174 in the centralized network 110 and/or the decentralized network 130 on behalf of a user 108 who owns the IoT device 106. This allows the system to certify that it is the authorized IoT device 106 and not some unauthorized entity that is attempting to perform a data interaction 174 on behalf of a user 108. This greatly reduces the possibility of bad actors tampering with a data interaction 174 initiated and/or performed by an IoT device 106.

It may be noted that while certain embodiments of the present disclosure are described with reference to IoT devices 106, a person having ordinary skill in the art may appreciate that these embodiments apply to other computing nodes 104 of the computing infrastructure 102.

Interaction manager 170 may be configured to tag an NFT 154 to an IoT device 106 owned by user 108. Tagging an NFT 154 to the IoT device 106 generally includes mapping an NFT 154 generated for the IoT device 106 to the device ID 171 of the IoT device 106. As described above, a user 108 may register one or more IoT devices 106 to perform data interactions 174 (e.g., data interactions relating to real-world data file 114 of the user 108) in the centralized network 110 and/or to perform data interactions 174 (data interactions relating to virtual data file 134) in the decentralized network 130. The centralized server 112 may be configured to store as part of the user profile of the user 108, the device IDs 171 of all computing nodes 104 (e.g., IoT devices 106) registered to perform data interactions 174 in the centralized network 110 for the user 108 mapped to the user ID 172 of the user 108. The decentralized server 132 may be configured to store as part of the user profile of the user 108, the device IDs 171 of all computing nodes 104 (e.g., IoT devices 106) registered to perform data interactions 174 in the decentralized network 130 for the user 108 mapped to the user ID 172 of the user 108. In one embodiment, interaction manager 170 may be configured to obtain the device IDs 171 of one or more IoT devices 106 and respective user ID of the user 108 from the centralized server 112 and/or the decentralized server 132 and store the device IDs 171 mapped to the respective user ID 172 in the interaction manager 170.

Interaction manager 170 may be configured to initiate mapping of an NFT 154 to an IoT device 106 by transmitting an authorization request to a user device of the user 108, wherein the authorization request may include a request to approve mapping an NFT 154 to the IoT device 106. In one embodiment, the authorization request includes a device ID 171 of the IoT device 106 requested for NFC mapping. The user device may be a computing node 104 that is part of the computing infrastructure 102 and may include, but is not limited to, a desktop computer, a laptop computer, a tablet computer and a smartphone. The interaction manager 170 may be configured to transmit the authorization request to the user device of the user 108 in response to receiving a tagging request to may an NFT 154 to the IoT device 106. The tagging request may originate from a user device of the user 108, from the centralized server 112, or a computing node 104 of the decentralized network 130.

Once the interaction manager 170 receives an approval of the authorization request from the user device of the user 108, the interaction manager 170 transmits a request to the minting server 152 of the NFT blockchain network 150 to generate an NFT 154 in relation to the IoT device 106. This request to the minting server 152 may include the device ID 171 of the IoT device 106 and the user ID 172 of the user 108 associated with this device ID 171. In response to receiving the minting request from the interaction manager 170, the minting server 152 generates an NFT 154 in relation to the IoT device 106. The generated NFT 154 at least includes a unique token ID 173 of the NFT 154, the device ID 171 of the IoT device 106 (associating the NFT 154 to the particular IoT device 106), and the user ID 172 of the user 108 (identifying the owner of the NFT 154 and the IoT device 106). Once the NFT 154 has been generated, the minting server transmits an indication to the interaction manager 170 confirming that the requested NFT 154 has been generated in relation to the IoT device 106. This indication may include a token ID 173 of the NFT 154. Interaction manager 170 may be configured to store the token ID 173 of the NFT 154 mapped to the device ID 171 of the IoT device 106 and the user ID of the user 108. In one embodiment, interaction manager 170 may be configured to transmit the token ID 173 of the NFT 154 to the centralized server 112 and/or the decentralized server 132 (or another computing node 104 of the decentralized network 130) where the IoT device 106 is registered for the user 108. The centralized server 112 and/or the decentralized server 132 (or another computing node 104 of the decentralized network 130) may store the token ID 173 of the NFT 154 mapped to the device ID 171 of the IoT device 106 and the user ID of the user 108.

Once the NFT 154 has been generated and mapped to the IoT device 106, interaction manager 170 may be configured to verify the identity of the IoT device 106 using the NFT 154, for example, when the IoT device 106 initiates a data interaction 174 in the centralized network 110 and/or the decentralized network 130. When the IoT device 106 initiates/authorizes a data interaction 174 (e.g., data interaction in relation to the real-world data file 114 or virtual data file 134) to be performed in the centralized network 110 or the decentralized network 130, interaction manager 170 obtains (e.g., from a memory of the interaction manager 170) the token ID 173 of the NFT 154 mapped to the device ID 171 of the IoT device 106 and requests the NFT blockchain network to verify the identity of the IoT device 106. In one embodiment, the request to the NFT blockchain network 150 includes one or more of the token ID 173 of the NFT 154, the device ID of the IoT device 106 mapped to the token ID 173 and the user ID of the user 108 mapped to the token ID 173. The request for verifying the IoT device 106 may be sent to a computing node 104 of the NFT blockchain network 150 that is configured to process such requests. In response to receiving the request from the interaction manager 170, a computing node 104 of the NFT blockchain network 150 accesses the NFT 154 (stored in the blockchain of the NFT blockchain network 150) associated with the token ID 173 received from the interaction manager 170 and verifies the identity of the IoT device 106 based on the device ID 172 included in the NFT 154. Upon successfully verifying the identity of the IoT device 106 associated with the device ID 171, a computing node 104 of the NFT blockchain network 150 transmits an indication to the interaction manager 170 that the IoT devices 106 is verified.

In response to receiving the indication from the NFT blockchain network 150 that the IoT device 106 is authentic, interaction manager 170 proceeds to process the data interaction 174 authorized by the IoT device 106. Processing the data interaction 174 may include requesting the centralized server 112 or a computing node 104 of the decentralized network 130 to perform the requested data interaction 174. For example, when the requested data interaction 174 includes transmitting real-world data objects 116 from the real-world data file 114 of the user 108 to another real-world data file 114 of another user 108 or entity, the interaction manager, in response to receiving the indication that the IoT device 106 has been verified, instructs the centralized server 112 to transfer the real-world data objects 116 from the real-world data file 114 of the user 108 to the other real-world data file 114 of another user 108 or entity.

Interaction manager 170 may be configured to initiate and facilitate recording information relating to the data interaction 174 (e.g., initiated by the IoT device 106) in the NFT 154 associated with the IoT device 106. Once the data interaction 174 initiated by the IoT device 106 has been processed (e.g., in the centralized network 110 or the decentralized network 130), interaction manager 170 may be configured to obtain an interaction log 175 associated with the data interaction 174, wherein the interaction log 175 includes information related to the data interaction 174 including, but not limited to, a data interaction ID associated with the data interaction 174, the user ID 172 associated with the user 108 who owns the IoT device 106, the device ID 171 associated with the IoT device 106, an identity associated with a first data file (e.g., real-world data file 114 or virtual data file 134) associated with the device ID 171/user ID 172 that transferred data objects (e.g., real-world data objects 116 or virtual data objects 136) to a second data file (e.g., real-world data file 114 or virtual data file 134) or received data objects (e.g., real-world data objects 116 or virtual data objects 136) from the second data file (e.g., real-world data file 114 or virtual data file 134) as part of the data interaction 174, an identity associated with a second data file (e.g., real-world data file 114 or virtual data file 134) that received data objects (e.g., real-world data objects 116 or virtual data objects 136) from the first data file (e.g., real-world data file 114 or virtual data file 134) or transferred data objects (e.g., real-world data objects 116 or virtual data objects 136) to the first data file (e.g., real-world data file 114 or virtual data file 134) as part of the data interaction 174, and a second user ID 172 of a second user 108 associated with the second data file (e.g., real-world data file 114 or virtual data file 134). Centralized server 112 and one or more computing nodes 104 of the decentralized network 130 may be configured to generate interaction logs 175 for data interactions conducted in the centralized network 110 and decentralized network 130 respectively. Interaction manager 170 may be configured to transmit at least a portion of the information from the interaction log 175 (along with the token ID 173 of the NFT associated with the IoT device) to the NFT blockchain network 150 (e.g., a computing node 104 of the NFT blockchain network 150). A computing node 104 of the NFT blockchain network 150 may be configured to access the NFT 154 associated with the IoT device 106 based on the token ID 173 and record the received information relating to the data interaction 174 in the NFT 154.

In some cases, the data interaction 174 initiated by the IoT device 106 may fail because of one or more reasons as described below. In such a case, interaction manager 170 may be configured to initiate and facilitate recording information relating to the failed data interaction 174 in the NFT 154 associated with the IoT device 106. Upon detecting that the data interaction 174 has failed, interaction manager 170 obtains an interaction log 175 associated with the failed data interaction 174. The interaction log 175 associated with the failed data interaction 174 includes information relating to the failed data interaction 174 including, but not limited to, a data interaction ID associated with the failed data interaction 174, the user ID associated with the user 108, the device ID 171 associated with the IoT device 106, an identity associated with a first data file (e.g., real-world data file 114 or virtual data file 134) associated with the device ID 171/user ID 173 that was to transfer data objects (e.g., real-world data objects 116 or virtual data objects 136) to a second data file (e.g., real-world data file 114 or virtual data file 134) or receive data objects (e.g., real-world data objects 116 or virtual data objects 136) from the second data file (e.g., real-world data file 114 or virtual data file 134) as part of the data interaction 174, an identity associated with a second data file (e.g., real-world data file 114 or virtual data file 134) that was to receive data objects (e.g., real-world data objects 116 or virtual data objects 136) from the first data file (e.g., real-world data file 114 or virtual data file 134) or transfer data objects (e.g., real-world data objects 116 or virtual data objects 136) to the first data file (e.g., real-world data file 114 or virtual data file 134) as part of the data interaction 174, and a second user ID 172 of a second user 108 associated with the second data file (e.g., real-world data file 114 or virtual data file 134). Centralized server 112 and one or more computing nodes 104 of the decentralized network 130 may be configured to generate interaction logs 175 for failed data interactions 174 conducted in the centralized network 110 and decentralized network 130 respectively. Interaction manager 170 may be configured to transmit at least a portion of the information from the interaction log 175 relating to the failed data interaction 174 (along with the token ID 173 of the NFT associated with the IoT device) to the NFT blockchain network 150 (e.g., a computing node 104 of the NFT blockchain network 150). A computing node 104 of the NFT blockchain network 150 may be configured to access the NFT 154 associated with the IoT device 106 based on the received token ID 173 and record the received information relating to the failed data interaction 174 in the NFT 154 associated with the IoT device 106.

Interaction manager 170 may be configured to generate a separate NFT 154 for the failed data interaction 174. For example, after obtaining the interaction log 175 associated with the failed data interaction 174, interaction manager 170 transmits a request to the minting server 152 of the NFT blockchain network 150 to generate an NFT 154 in relation to the failed data interaction 174. The request may include at least a portion of the information included in the interaction log 175 of the failed data interaction 174. Upon receiving the request from the interaction manager 170, the minting server 152 generates an NFT 154 in relation to the failed data interaction 174, wherein the generated NFT 154 includes at least a token ID 173 of the NFT 154, and the information associated with the failed data interaction 174 received from the interaction manager 170. Minting server 152 (or another computing node 104 of the NFT blockchain network 150) may be configured to transmit an indication to the interaction manager 170 that the NFT 154 has been generated in relation to the failed data interaction 174, wherein the indication includes the token ID 173 of the NFT 154. Interaction manager 170 may be configured to store (e.g., in a memory of the interaction manager 170) the token ID 173 of the NFT 154 mapped to one or more of the transaction ID of the failed data interaction 174, the device ID of the IoT device 106 that initiated/authorized the failed data interaction 174 and the user ID 172 of the user 108 who owns the IoT device 106.

In some cases, the failed data interaction 174 may be re-processed after applying a solution that resolves an error that caused failure of the data interaction 174. In such cases, interaction manager 170 may be configured to initiate/facilitate recording information related to the re-processed data interaction 174 in the NFT 154 associated with the IoT device 106 that initiated the data interaction and/or the NFT 154 separately generated for the failed data interaction 174. For example, when the re-processed data interaction 174 completes processing in the centralized network 110 or the decentralized network 130, interaction manager 170 obtains the token ID 173 of the NFT 154 associated with the IoT device 106 or the transaction ID of the failed data interaction 174. The interaction manager 170 may be configured to transmit a request to record the re-processed data interaction to a computing node 104 of the NFT blockchain network 150, wherein the request includes the token ID 173 along with one or more of a transaction ID associated with the re-processed data interaction and the solution applied to resolve the error associated with the failed data interaction. Upon receiving the request from the interaction manager 170, a computing node 104 of the NFT blockchain network 150 access the NFT 154 (stored in the blockchain of the NFT blockchain network 150) based on the received token ID 173 and stores the received transaction ID associated with the re-processed data interaction and the solution in the NFT 154.

Thanks to the immutable nature of NFTs, storing information relating to data interactions 174 (successful or failed data interaction) in NFTs 154 prevents tampering with data associated with the data interactions 174 and generally makes conducting data interactions 174 in the centralized network 110 and decentralized network 130 secure.

Selecting Data Interactions to be Performed by an Internet of Things (IoT) Device Interaction manager 170 may be configured to track data interactions 174 initiated/authorized by an IoT device 106 and suggest one or more data interactions 174 that may be performed in the future based on the previous data interactions 174. In this context, the IoT device 106 may be configured to perform one or more data interactions 174, wherein each of the one or more data interactions 174 may include transferring data objects (e.g., real-world data objects 116 or virtual data objects 136) from the data file (e.g., real-world data file 114 or virtual data file 134) of the user 108 to a second data file (e.g., real-world data file 114 or virtual data file 134) of a second user 108 or entity in relation to an event 118 that takes place in the centralized computing network 110 or an event 138 that takes place in the decentralized computing network 130. An event 118 or 138 may be associated with a product or service obtainable in the centralized network 110 or the decentralized network 130 respectively. The data interaction 174 in relation to the event 118/138 may include transferring data objects (e.g., real-world data objects 116 or virtual data objects 136) to obtain a product or service in the centralized network 110 or the decentralized network 130 respectively. For example, each product or service provided in the centralized network 110 or the decentralized network 130 may be obtained by a user 108 by transferring a pre-configured amount of respective real-world data objects 116 or virtual data objects 136 to a data file (e.g., real-world data file 114 or virtual data file 134) of a second user 108 or entity that provides the product or service in the respective network. A user 108 may perform a data interaction 174 in relation to an event 118/138 using an IoT device 106 (e.g., configure the IoT device 106 to perform the data interaction) or another computing node 104 of the user 108 (e.g., smartphone, tablet computer, laptop computer etc.).

Interaction manager 170 may be configured to record a plurality of data interactions conducted (e.g., initiated/authorized) using an IoT device 106 associated with the user 108 in relation to events 118 and 138 that occurred in the centralized network 110 and the decentralized network 130 respectively. Each recorded data interaction 174 may include transferring data objects (e.g., real-world data objects 116 or virtual data objects 136) from the data file (e.g., real-world data file 114 or virtual data file 134) of the user 108 to a second data file (e.g., real-world data file 114 or virtual data file 134) of a second user 108 or entity in relation to an event 118 that took place in the centralized computing network 110 or an event 138 that took place in the decentralized computing network 130.

Interaction manager 170 may be configured to determine a behavior log 176 associated with the user 108, wherein the behavior log 176 stores the events 118/138 associated with the plurality of data interactions conducted using the IoT device 106. Interaction manager 170 may be configured to monitor future events 118/128 that are to occur in the respective centralized network 110 and the decentralized network 130, and determine based on the behavior log 176 whether the user 108 may be interested in obtaining a product or service associated with a future event 118/138. For example, based on monitoring future events 138 that are to occur in the decentralized network 130, interaction manager 170 may determine that a particular future event 138 is to occur in the decentralized network 130. The interaction manager 170 compares the particular future event 138 with the previous events 138 recorded in the behavior log 176 associated with the user 108. Based on this comparison, interaction manager 170 may determine that a data interaction 174 was previously conducted using the IoT device 106 in relation to a previous event 138 and that the previous event is associated with or related to the particular future event 138. For example, interaction manager 170 may determine that the previous event 138 from the behavior log 176 is related to or associated with the particular future event 138 in response to detecting one or more of the previous event and the particular future event relate to the same event 138 (relate to obtaining the same product or service), the previous event and the particular future event are provided by the same user/entity, and the previous event and the particular future event takes place at the same date/time.

In response to determining that the previous event 138 from the behavior log 176 is related to or associated with the particular future event 138 that is to occur in the decentralized network 130, interaction manager may transmit an authorization request to a computing node 104 of the user 108 to conduct a data interaction in relation to the future event. The computing node 104 of the user 108 may include, but is not limited to, a smartphone, a laptop computer, a tablet computer and a desktop computer. The authorization request may include information relating to the future event 138 such as a type of product or service related to the future event 138, an amount of virtual data objects 136 that are to be transferred to a target user/entity to obtain the product or service, and an identity of the target user/entity that is to receive the virtual data objects 136. Upon receiving an authorization to conduct the data interaction in relation to the future event 138 from the computing node 104 of the user 108, interaction manager 170 initiates the data interaction in relation to the future event 138 using the IoT device 106 of the user 108 that is setup to conduct data interactions on behalf of the user 108. For example, interaction manager 170 may transmit an indication to the IoT device 106 that the data interaction relating to the future event 138 is authorized. The IoT device 106, in response to receiving the indication from the interaction manager 170, may initiate the data interaction in relation to the future event 138 including transferring a pre-configured amount of virtual data objects 136 from the virtual data file 134 of the user 108 to another virtual data file 134 of the target user/entity.

In one or more embodiments, when the data interaction in relation to the future event is successfully processed, interaction manager 170 may be configured to add the future event 138 to the behavior log 176 associated with the user 108.

Interaction manager 170 may be configured to train a machine learning model 177 based on the behavior log 176 associated with the user 108 to identify one or more future events 118/136 that are to occur in the respective network 110/130 that are associated with respective one or more previous events 118/136 from the behavior log 176.

It may be noted that while the above description is in relation to events 138 occurring in the decentralized network 130, a person having ordinary skill in the art may appreciate that the above description applies to events 118 occurring in the centralized network 110.

Processing Data Interactions Performed by an Internet of Things (IoT) Device Interaction manager 170 may be configured to determine how a data interaction 174 initiated/authorized by an IoT device 106 is to be processed. In certain embodiments, interaction manager 170 may determine whether the data interaction 174 initiated/authorized by an IoT device 106 is to be processed in the centralized network 110 or the decentralized network 130. As described above, a data interaction 174 performed in the centralized network 110 may include transferring real-world data objects 116 from the real-world data file 114 associated with the user 108 to a second real-world data file 114 of a second user 108 or entity, in relation to obtaining a product or service provided in the centralized network 110. Similarly a data interaction 174 performed in the decentralized network 130 may include transferring virtual data objects 136 from the virtual data file 134 associated with the user 108 to a second virtual data file 134 of a second user 108 or entity, in relation to obtaining a product or service provided in the decentralized network 130.

Interaction manager 170 may determine whether the data interaction 174 initiated/authorized by an IoT device 106 is to be processed in the centralized network 110 or the decentralized network 130 based on one or more of several techniques.

In one embodiment, interaction manager 170 obtains a behavior log 176 associated with the user 108 who owns the IoT device 106, wherein the behavior log 176 includes a record of data interactions 174 conducted (e.g., initiated/authorized) using the IoT device 106 of the user 108. In response to detecting that the IoT device 106 has initiated/authorized a first data interaction 174, interaction manager 170 compares the first data interaction 174 with the data interactions 174 recorded in the behavior log 176. Based on this comparison, interaction manager 170 may determine that the first data interaction 174 initiated by the IoT device 106 is associated with a second data interaction 174 from the behavior log 176. In one example, interaction manager 170 may determine that the first data interaction 174 is associated with the second data interaction 174 in response to detecting one or more of the first and second data interactions relate to the same event (relate to obtaining the same product or service), the first and second data interactions include transferring data objects to the same target user/entity, and the first and second data interactions take place at the same date of the month, same day of the week, and/or same time of day.

In response to determining that the first data interaction 174 initiated by the IoT device 106 is associated with a second data interaction 174 from the behavior log 176, interaction manager 170 determines (e.g., from the behavior log 176 or from an interaction log associated with the second data interaction 174) whether the second data interaction 174 was processed in the centralized network 110 or the decentralized network 130. If the second data interaction 174 was detected as processed in the centralized network 110, interaction manager 170 determines that the first data interaction 174 is also to be processed in the centralized network 110. On the other hand, if the second data interaction 174 was detected as processed in the decentralized network 130, interaction manager 170 determines that the first data interaction 174 is also to be processed in the decentralized network 130.

Upon determining that the first data interaction 174 is to be performed in the centralized network 110, interaction manager 170 initiates processing of the first data interaction 174 in the centralized network 110. For example, interaction manager 170 transmits information relating to the first data interaction 174 (e.g., user id 172, identity of the real-world data file 114, an amount of real-world data objects 116 to be transferred, an identity of the target real-world data file 114 etc.) to the centralized server 112. The centralized server 112 may process the first data interaction 174 by transferring the real-world data objects 116 from the real-world data file 114 associated with the user 108 to the target real-world data file 114.

Upon determining that the first data interaction 174 is to be performed in the decentralized network 130, interaction manager 170 initiates processing of the first data interaction 174 in the decentralized network 130. For example, interaction manager 170 transmits information relating to the first data interaction 174 (e.g., user id 172, identity of the virtual data file 134, an amount of virtual data objects 136 to be transferred, an identity of the target virtual data file 134 etc.) to a computing node 104 of the decentralized network 130. A computing node 104 of the decentralized network 130 may process the first data interaction 174 by transferring the virtual data objects 136 from the virtual data file 134 associated with the user 108 to the target virtual data file 134.

In certain embodiments, the decentralized network 130 may support processing of data interactions 174 in the decentralized network 130 using several types of virtual data objects 136. Upon determining that the first data interaction 174 is to be performed in the decentralized network 130, interaction manager 170 may be configured to determine which one of the several types of virtual data objects 136 is to be used (e.g., transferred to the target user/entity) when processing the first data interaction 174 in the decentralized network 130. Generally, processing a data interaction in the decentralized network 130 using a particular type of virtual data objects 136 is associated with transferring a supplementary amount of the particular type of virtual data objects 136 to a processing server in the decentralized network 130 configured to process data interactions using the particular type of virtual data objects 136. This supplementary amount of the virtual data objects 136 is in addition to the pre-configured amount of virtual data objects 136 that are to be transferred to the target entity as part of processing the data interaction. Processing the same data interaction 174 using different types of virtual data objects 136 may involve transferring different supplementary amounts of the respective types of virtual data objects 136 to respective processing servers.

For example, the decentralized network 130 may support processing of data interactions 174 in the decentralized network 130 using a first type of virtual data objects 136 and a second type of virtual data objects 136. Interaction manager 170 may determine that, when using the virtual data objects of the first type during processing of the first data interaction 174, a first supplementary amount of the virtual data objects 136 of the first type is to be transferred to a first processing server in the decentralized network 130. The interaction manager 170 may additionally determine that, when using the virtual data objects 136 of the second type during processing of the first data interaction 174, a second supplementary amount of virtual data objects 136 of the second type is to be transferred to a second processing server in the decentralized network 130. The interaction manager 170 may additionally determine that the first supplementary amount of virtual data objects of the first type is less than the second supplementary amount of the virtual data objects of the second type needed to process the first data interaction. In response, to determining that a lesser supplementary amount of the virtual data objects of the first type is needed to process the first data interaction 174, interaction manager 170 may determine to process the first data interaction 174 using the virtual data objects of the first type. In this context, the interaction manager 170 may transmit an indication to the first processing server of the decentralized network to process the first data interaction using virtual data objects of the first type. In response to receiving the indication, the first processing server may process the first data interaction 174 by transferring the pre-configured amount of virtual data objects of the first type from the virtual data file 134 of the user 108 to the target virtual data file and transferring the first supplementary amount of virtual data objects of the first type to the first processing server.

In an additional or alternative embodiment, when multiple data interactions 174 are initiated simultaneously or very close in time by one or more IoT devices 106 associated with a user 108, interaction manager 170 may be configured to prioritize processing of certain data interactions 174 over others based on a priority associated with each data interaction 174. Interaction manager 170 may be configured to determine a priority associated with each data interaction 174 initiated by an IoT device 106 in real-time based on a type of the data interaction 174. For example, when a data interaction 174 is in relation to obtaining a product or service associated with a time deadline, interaction manager 170 may assign a higher priority to this data interaction 174 over other data interactions 174. In another example, when a requested data interaction 174 is to be performed in the decentralized network 130 using a particular type of virtual data objects 136 and a time window to process the data interaction 174 with minimal or reasonable supplementary amount of the virtual data objects 136 is approaching, interaction manager 170 assigns a higher priority to the data interaction 174 over other data interactions. In another example, each data interaction may be associated with a user assigned priority level. Interaction manager 170 may prioritize the data interactions 174 based on the user assigned priority levels associated with the data interactions 174, by assigning a higher priority to a data interaction 174 that is associated with a higher user assigned priority level. Interaction manager 170 may be configured to process or trigger processing of the data interactions 174 in the order of their assigned priorities, wherein data interactions 174 having higher assigned priorities are processed before data interactions 174 having lower assigned priorities.

Resolving Failed Data Interactions Performed by an Internet of Things (IoT) Device Interaction manager 170 may be configured to resolve failure incidents 178 associated with failed data interactions 174 that were initiated by an IoT device 106. A failure incident 178 may refer to a failure of a data interaction 174 relating to a transfer initiated by an IoT device 106 associated with a user 108 of data objects (e.g., real-world data objects 116 or virtual data objects 136) from a source data file (e.g., real-world data file 114 or virtual data file 134) associated with the IoT device 106/user 108 to a target data file (e.g., real-world data file 114 or virtual data file 134). As described above, an IoT device 106 may initiate/authorize the transfer of the data objects to obtain a product or service in the respective centralized network 110 or decentralized network 130.

Interaction manager 170 may be configured resolve a failure incident 178 by applying a known solution 186 that was previously implemented to resolve a same or similar failure incident 178 in the past. In this context, interaction manager 170 may store a plurality of known failure incidents 181 and a known solution 186 corresponding to each known failure incident 181, wherein each known failure incident 181 corresponds to a failure of a previous data interaction 174 conducted in the centralized network 110 or the decentralized network 130. A known solution 186 corresponding to a known failure incident 181 is a solution that was applied to resolve one or more errors that caused the known failure incident 181. In an additional embodiment, interaction manager 170 stores an interaction log 175 associated with each known failure incident 181, wherein the interaction log 175 associated with a known failure incident 181 is a log of a failed data interaction 174 in the centralized network 110 or the decentralized network 130.

As described in more detail below, to increase the speed with which a known solution 186 is found in relation to a failure incident 178, interaction manager 170 may be configured classify the known failure incidents 181 into several categories (e.g., known failure clusters 182) and sub-categories (e.g., known incident patterns 183). This allows the interaction manager 170 to identify a category and sub-category that relates to a failure incident 178 and search for a known failure incident 181 and corresponding known solution 186 in the identified category and sub-category only. This significantly increase the speed with which a known solution 186 is found in relation to the failure incident 178.

In this context, interaction manager 170 may be configured to determine a plurality of known failure clusters 182 based on the known failure incidents 181, wherein each known failure cluster 182 corresponds to a failure type of a plurality of failure types. In other words, interaction manager 170 classifies the known failure incidents 181 stored at the interaction manager 170 by a type of failure associated with the known failure incidents 181, such that all known failure incidents 181 that correspond to a particular type of failure are assigned to the same known failure cluster 182. In one example, a type of failure may include failure of a data interaction 174 due to errors in a hardware or software component of the centralized or decentralized network. In this example, all known failure incidents 181 in which the data interactions 174 failed because of one or more errors in software and/or hardware components are assigned to the same known failure cluster 182. In another example, a type of failure may include failure of a data interaction 174 due to insufficient data objects (e.g., real-world data objects 116 or virtual data objects 136) in the respective data file (e.g., real-world data file 114 or virtual data file 134). In this example, all known failure incidents 181 in which the data interactions 174 failed because of insufficient data objects (e.g., real-world data objects 116 or virtual data objects 136) in the respective data file (e.g., real-world data file 114 or virtual data file 134) are assigned to the same known failure cluster 182.

Interaction manager 170 may be configured to further classify known failure incidents 181 in each known failure cluster 182 based on incident patterns 183 associated with the known failure incidents 181. For example, interaction manager 170 may be configured determine an incident pattern 189 for each known failure incident 181 in a known failure cluster 182. Determining a known incident pattern 183 for a known failure incident 181 may include determining one or more of a known failure pattern 184 and a known behavioral pattern 185 corresponding to the known failure incident 181. The known failure pattern 184 includes at least one known cause of failure associated with the respective known failure incident 181, and the known behavioral pattern 185 includes at least one parameter indicating a known behavior of at least one user 108 associated with the known incident pattern 183. Each known incident pattern 183 assigned to a known failure incident 181 corresponds to a unique known failure pattern 184, a unique known behavioral pattern 185 or a combination thereof associated with the known failure incident 181. A known failure incident 181 is assigned a different incident pattern 183 if the known failure incident 181 is associated with at least one of a different known failure pattern 184 or a different known behavioral pattern 185. A known failure cluster 182 of known failure incidents 181 may include several sub-clusters of known failure incidents 181, wherein each sub-cluster of known failure incidents 181 corresponds to a different known incident pattern 183. For example, when a known failure cluster 182 corresponds to failed data interactions 174 because of errors in a hardware or software component, each known failure incident 181 in this known failure cluster 182 may be assigned a different known incident pattern 183 based on a known failure pattern 184 associated with the known failure incident 181. In this example, a known failure pattern 184 may include, but is not limited to, one or more of failure of a processing server (e.g., centralized server 112 in centralized network 110 or decentralized network), failure of a network router, failure of a network gateway, and failure or errors in the IoT device 106 that initiated the failed data interaction 174. In another example, when a known failure cluster 182 corresponds to failed data interactions 174 because of insufficient data objects (e.g., real-world data objects 116 or virtual data objects 136) in the respective data file (e.g., real-world data file 114 or virtual data file 134), each known failure incident 181 in this known failure cluster 182 may be assigned a different known incident pattern 183 based on a known failure pattern 184 and/or a known behavioral pattern 185 associated with the known failure incident 181. In this example, a known failure pattern 184 may include, but is not limited to, one or more of insufficient data objects due to automatic transfer of data objects from the data file, insufficient data objects due to unintentional transfer of data objects from the data file, insufficient data objects due to theft of data objects from the data file, and insufficient data objects due to a failed transfer of data objects to the data file. In this example, a known behavioral pattern 185 of a user 108 associated with a known incident pattern 183 may include, but is not limited to, automatic and periodic transfer of a pre-configured amount of data objects into the data file of the user 108, other data files of the user 108 registered for data interactions, a high confidence indicator associated with the user 108 etc.

In operation, when the interaction manager 170 detects a first failure incident 178 associated with a failure of a data interaction 174 relating to a transfer initiated by an IoT device 106 of data objects (e.g., real-world data objects 116 or virtual data objects 136) from a source data file (e.g., real-world data file 114 or virtual data file 134) associated with the IoT device 106/user 108 to a target data file (e.g., real-world data file 114 or virtual data file 134), interaction manager 170 first obtains a first interaction log 175 associated with the failed data interaction 174. Interaction manager 170 may be configured to compare the first interaction log 175 with a plurality of second interaction logs 175 associated with the plurality of known failure incidents 181 stored at the interaction manager 170. Based on the comparison of the first interaction log 175 with the plurality of second interaction logs 175, interaction manager 170 may be configured to determine a correlation probability 187, wherein the correlation probability 187 indicates a degree of similarity between contexts associated with the first interaction log 175 and at least a portion of the second interaction logs 175. In one embodiment, to determine the correlation probability 187, interaction manager 170 may be configured to determine a first interaction context based on the first interaction log 175 associated with the first failure incident 178, wherein the first interaction context includes the context associated with the first failure incident 178. A context associated with a failure incident 178 includes one or more reasons or errors that caused the failure incident 178 and/or conditions prevailing at the time the data interaction failed. Interaction manager 170 additionally determines second interaction contexts based on the plurality of second interaction logs 175, wherein each second interaction context comprises a context associated with a respective second interaction log 175. Interaction manager 170 may be configured to compare the first interaction context associated with the first interaction log 175 with each of the second interaction contexts associated with the second interaction logs 175 to determine the correlation probability 187.

When the determined correlation probability 187 equals or exceeds a threshold probability 188, interaction manager 170 determines a known failure cluster 182 corresponding to the first failure incident 178. To determine a known failure cluster 182 corresponding to the first failure incident 178, interaction manager 170 determines a first failure type associated with the first failure incident 178 and determines a known failure cluster 182 that corresponds to the first failure type. For example, when the first failure type corresponds to a failure of the data interaction 174 due to errors in a hardware or software component of the centralized or decentralized network, interaction manager 170 determines the known failure cluster 182 that includes known failure incidents 181 in which data interactions 174 failed because of errors in a hardware or software component of the centralized or decentralized network.

Once a known failure cluster 182 corresponding to the first failure incident 178 is determined, interaction manager 170 may be configured to determine a known incident pattern 183 of a known failure incident 181 in the determined known failure cluster 182 that corresponds to the first failure incident 178. To determine a known incident pattern 183, interaction manager 170 determines a first incident pattern 189 associated with the first failure incident 181. Determining the first incident pattern 189 may include determining a first failure pattern 179 associated with the first failure incident 178, wherein the first failure pattern 179 includes a cause of failure associated with the first failure incident 178. Determining the first incident pattern 189 may additionally include determining a first behavioral pattern 180 associated with the first failure incident 178 including at least one parameter indicating a behavior of the user 108 associated with the source data file from which data objects are to be transferred/IoT device 106 that initiated the data interaction 174 associated with the first failure incident 178. For each known incident pattern 183 corresponding to a known failure incident 181 in the determined known failure cluster 182, interaction manager 170 compares the first failure pattern 179 with a known failure pattern 184 associated with the known incident pattern 183. In an additional or alternative embodiment, for each known incident pattern 183 corresponding to the known failure incident 181 in the determined known failure cluster 182, interaction manager 170 compares the first behavioral pattern 180 with a known behavioral pattern 185 associated with the known incident pattern 183. Based on the comparison of the failure patterns and/or the behavioral patterns, interaction manager 170 may determine a known incident pattern 183 that matches with the first incident pattern 189 associated with the first failure incident 178.

Once a known incident pattern 183 corresponding to the first failure incident 178 has been determined, interaction manager 170 may be configured to obtain (e.g., from the memory of the interaction manager 170) a known solution 186 that corresponds to the known failure incident 181 associated with the matching known incident pattern 183. Interaction manager 170 may be configured to re-process (e.g., trigger processing) the failed data interaction 174 associated with the first failure incident 178 based on the determined known solution, for example, by performing at least one corrective action specified in the determined known solution.

In one example, interaction manager 170 may determine that the failed data interaction 174 associated with the first failure incident 178 failed because of failure of a processing server of the decentralized network 130. In this case, the interaction manager 170 first selects the known failure cluster 182 that includes known failure incidents 181 in which data interactions 174 failed because of errors in a hardware or software component of the centralized or decentralized network. Once the known failure cluster 182 has been determined, interaction manager 170 determines the first failure pattern 179 associated with the first failure incident 178 as including failure of a data interaction 174 due to failed processing server in the decentralized network 130. Subsequently, based on comparing the determined first failure pattern 179 with the known failure patterns 184 of known failure incidents 181 in the selected known failure cluster 182, interaction manager 170 determines a known failure incident 181 in the selected known failure cluster 182 that corresponds to a data interaction 174 that also failed as a result of a failed processing server in the decentralized network 130. The determined known failure incident 181 may correspond to a known solution 186 that includes instructions for resolving the failed processing server in the decentralized network 130. Interaction manager 170 may obtain the known solution 186 and resolve the error in the processing server based on the instructions provided in the known solution 186 before re-processing the failed data interaction 174.

In another example, interaction manager 170 may determine that the failed data interaction 174 associated with the first failure incident 178 including transfer of a selected amount of real-world data objects 116 from the real-world data file 114 of the user 108 to a target real-world data file 114 failed because of insufficient data objects in the real-world data file 114 of the user 108 due to an automatic transfer of real-world data objects 116 from the real-world data file 114 as part of another data interaction 174. In this case, the interaction manager 170 first selects the known failure cluster 182 that includes known failure incidents 181 in which data interactions 174 failed because of insufficient real-world data objects 116 in a real-world data file 114. Once the known failure cluster 182 has been determined, interaction manager 170 determines the first failure pattern 179 associated with the first failure incident 178 as including automatic transfer of real-world data objects 116 from the real-world data file 114 as part of another data interaction 174. Additionally, interaction manager 170 determines the first behavioral pattern 180 associated with the first failure incident 178 as including automatic and periodic transfer of a pre-configured amount of data objects into the real-world data file of the user 108, other real-world data files of the user 108 registered for data interactions and having sufficient real-world data objects 116 for completing the data interaction 174, and a high confidence indicator associated with the user 108. Subsequently, based on comparing the determined first failure pattern 179 and first behavioral pattern 180 with respective known failure patterns 184 and known behavioral patterns 185 associated with known failure incidents 181 in the selected known failure cluster 182, interaction manager 170 determines a known failure incident 181 in the selected known failure cluster 182 that corresponds to a data interaction 174 that also failed as a result of automatic transfer of real-world data objects 116 from the respective real-world data file and is associated with a user 108 with the same behavioral pattern 180. The determined known failure incident 181 may correspond to a known solution 186 that includes instructions for resolving the failure incident 178 by completing the failed transfer of real-world data objects 114 from a secondary real-world data file 114 of the user 108. Interaction manager 170 may obtain the known solution 186 and resolve the error in the processing server based on the instructions provided in the known solution 186 before re-processing the failed data interaction 174.

In a banking use case, the system and method disclosed herein may be used in relation to banking transactions performed by a computing node 104 (e.g., an IoT device 106). In this context, the centralized network 110 may correspond to a centralized bank network and the decentralized network 130 may correspond to a virtual currency (e.g., crypto currency) blockchain network. A real-world data file 114 may correspond to a bank account and the real-world data objects may correspond to funds in a bank account. A virtual data file 134 may correspond to a digital wallet storing virtual currency and the virtual data objects 136 may correspond to virtual currency. A data interaction in relation to a real-world data file 114 may include a bank transaction in which funds are transferred from a source bank account to a target bank account. Similarly a data interaction in relation to a virtual data file 134 may include blockchain transaction in which virtual currency is transferred from a source wallet to a target wallet.

FIG. 2 illustrates a flowchart of an example method 200 for performing secure data interactions using an IoT device 106, in accordance with one or more embodiments of the present disclosure. Method 200 may be performed by the interaction manager 170 shown in FIG. 1.

At operation 202, interaction manager 170 receives a tagging request to map a first NFT 154 to a first user device (e.g., IoT device 106).

At operation 204, in response to receiving the tagging request, interaction manager 170 transmits an authorization request to a second user device (e.g., a computing node 104 of the user 108) to map the first NFT 154 to the IoT device 106.

As described above, interaction manager 170 may be configured to tag an NFT 154 to an IoT device 106 owned by user 108. Tagging an NFT 154 to the IoT device 106 generally includes mapping an NFT 154 generated for the IoT device 106 to the device ID 171 of the IoT device 106. As described above, a user 108 may register one or more IoT devices 106 to perform data interactions 174 (e.g., data interactions relating to real-world data file 114 of the user 108) in the centralized network 110 and/or to perform data interactions 174 (data interactions relating to virtual data file 134) in the decentralized network 130. The centralized server 112 may be configured to store as part of the user profile of the user 108, the device IDs 171 of all computing nodes 104 (e.g., IoT devices 106) registered to perform data interactions 174 in the centralized network 110 for the user 108 mapped to the user ID 172 of the user 108. The decentralized server 132 may be configured to store as part of the user profile of the user 108, the device IDs 171 of all computing nodes 104 (e.g., IoT devices 106) registered to perform data interactions 174 in the decentralized network 130 for the user 108 mapped to the user ID 172 of the user 108. In one embodiment, interaction manager 170 may be configured to obtain the device IDs 171 of one or more IoT devices 106 and respective user ID of the user 108 from the centralized server 112 and/or the decentralized server 132 and store the device IDs 171 mapped to the respective user ID 172 in the interaction manager 170.

Interaction manager 170 may be configured to initiate mapping of an NFT 154 to an IoT device 106 by transmitting an authorization request to a user device of the user 108, wherein the authorization request may include a request to approve mapping an NFT 154 to the IoT device 106. In one embodiment, the authorization request includes a device ID 171 of the IoT device 106 requested for NFC mapping. The user device may be a computing node 104 that is part of the computing infrastructure 102 and may include, but is not limited to, a desktop computer, a laptop computer, a tablet computer and a smartphone. The interaction manager 170 may be configured to transmit the authorization request to the user device of the user 108 in response to receiving a tagging request to may an NFT 154 to the IoT device 106. The tagging request may originate from a user device of the user 108, from the centralized server 112, or a computing node 104 of the decentralized network 130.

At operation 206, interaction manager 170 receives an approval of the authorization request from the second user device (e.g., a computing node 104 of the user 108).

At operation 208, in response to receiving the approval, interaction manager 170 transmits a request to a minting server 152 of the NFT blockchain network 150 to generate the first NFT 154 for the IoT device 106.

As described above, once the interaction manager 170 receives an approval of the authorization request from the user device of the user 108, the interaction manager 170 transmits a request to the minting server 152 of the NFT blockchain network 150 to generate an NFT 154 in relation to the IoT device 106. This request to the minting server 152 may include the device ID 171 of the IoT device 106 and the user ID 172 of the user 108 associated with this device ID 171. In response to receiving the minting request from the interaction manager 170, the minting server 152 generates an NFT 154 in relation to the IoT device 106. The generated NFT 154 at least includes a unique token ID 173 of the NFT 154, the device ID 171 of the IoT device 106 (associating the NFT 154 to the particular IoT device 106), and the user ID 172 of the user 108 (identifying the owner of the NFT 154 and the IoT device 106).

At operation 210, interaction manager 170 receives an indication that the first NFT 154 has been generated for the IoT device 106, wherein the generated first NFT 154 includes at least a token ID 173 of the first NFT 154, a first device ID 171 associated with the IoT device 106, and a first user ID 172 associated with the first user 108. As described above, once the NFT 154 has been generated, the minting server transmits an indication to the interaction manager 170 confirming that the requested NFT 154 has been generated in relation to the IoT device 106. This indication may include a token ID 173 of the NFT 154.

At operation 212, interaction manager 170 stores in the memory the token ID 173 of the first NFT 154 mapped to the first device ID 171 and the first user ID 172. As described above, interaction manager 170 may be configured to store the token ID 173 of the NFT 154 mapped to the device ID 171 of the IoT device 106 and the user ID of the user 108. In one embodiment, interaction manager 170 may be configured to transmit the token ID 173 of the NFT 154 to the centralized server 112 and/or the decentralized server 132 (or another computing node 104 of the decentralized network 130) where the IoT device 106 is registered for the user 108. The centralized server 112 and/or the decentralized server 132 (or another computing node 104 of the decentralized network 130) may store the token ID 173 of the NFT 154 mapped to the device ID 171 of the IoT device 106 and the user ID of the user 108.

At operation 214, interaction manager 170 receives a second authorization from the IoT device 106 to perform a data interaction 174 associated with the first user 108.

At operation 216, interaction manager 170 obtains the token ID 173 of the first NFT 154 mapped to the IoT device 106.

At operation 218, interaction manager 170 requests the NFT blockchain network 150 based on the token ID 173 of the first NFT 154, verification of the IoT device 106 based on the first NFT 154.

As described above, once the NFT 154 has been generated and mapped to the IoT device 106, interaction manager 170 may be configured to verify the identity of the IoT device 106 using the NFT 154, for example, when the IoT device 106 initiates a data interaction 174 in the centralized network 110 and/or the decentralized network 130. When the IoT device 106 initiates/authorizes a data interaction 174 (e.g., data interaction in relation to the real-world data file 114 or virtual data file 134) to be performed in the centralized network 110 or the decentralized network 130, interaction manager 170 obtains (e.g., from a memory of the interaction manager 170) the token ID 173 of the NFT 154 mapped to the device ID 171 of the IoT device 106 and requests the NFT blockchain network to verify the identity of the IoT device 106. In one embodiment, the request to the NFT blockchain network 150 includes one or more of the token ID 173 of the NFT 154, the device ID of the IoT device 106 mapped to the token ID 173 and the user ID of the user 108 mapped to the token ID 173. The request for verifying the IoT device 106 may be sent to a computing node 104 of the NFT blockchain network 150 that is configured to process such requests. In response to receiving the request from the interaction manager 170, a computing node 104 of the NFT blockchain network 150 accesses the NFT 154 (stored in the blockchain of the NFT blockchain network 150) associated with the token ID 173 received from the interaction manager 170 and verifies the identity of the IoT device 106 based on the device ID 172 included in the NFT 154.

At operation 220, interaction manager 170 receives from the NFT blockchain network 150 and in response to the request for verification, an indication that the IoT device 106 is verified.

As described above, upon successfully verifying the identity of the IoT device 106 associated with the device ID 171, a computing node 104 of the NFT blockchain network 150 transmits an indication to the interaction manager 170 that the IoT devices 106 is verified.

At operation 222, in response to receiving the indication, interaction manager 170 processes the data interaction 174.

As described above, in response to receiving the indication from the NFT blockchain network 150 that the IoT device 106 is authentic, interaction manager 170 proceeds to process the data interaction 174 authorized by the IoT device 106. Processing the data interaction 174 may include requesting the centralized server 112 or a computing node 104 of the decentralized network 130 to perform the requested data interaction 174. For example, when the requested data interaction 174 includes transmitting real-world data objects 116 from the real-world data file 114 of the user 108 to another real-world data file 114 of another user 108 or entity, the interaction manager, in response to receiving the indication that the IoT device 106 has been verified, instructs the centralized server 112 to transfer the real-world data objects 116 from the real-world data file 114 of the user 108 to the other real-world data file 114 of another user 108 or entity.

Interaction manager 170 may be configured to initiate and facilitate recording information relating to the data interaction 174 (e.g., initiated by the IoT device 106) in the NFT 154 associated with the IoT device 106. Once the data interaction 174 initiated by the IoT device 106 has been processed (e.g., in the centralized network 110 or the decentralized network 130), interaction manager 170 may be configured to obtain an interaction log 175 associated with the data interaction 174, wherein the interaction log 175 includes information related to the data interaction 174 including, but not limited to, a data interaction ID associated with the data interaction 174, the user ID 172 associated with the user 108 who owns the IoT device 106, the device ID 171 associated with the IoT device 106, an identity associated with a first data file (e.g., real-world data file 114 or virtual data file 134) associated with the device ID 171/user ID 172 that transferred data objects (e.g., real-world data objects 116 or virtual data objects 136) to a second data file (e.g., real-world data file 114 or virtual data file 134) or received data objects (e.g., real-world data objects 116 or virtual data objects 136) from the second data file (e.g., real-world data file 114 or virtual data file 134) as part of the data interaction 174, an identity associated with a second data file (e.g., real-world data file 114 or virtual data file 134) that received data objects (e.g., real-world data objects 116 or virtual data objects 136) from the first data file (e.g., real-world data file 114 or virtual data file 134) or transferred data objects (e.g., real-world data objects 116 or virtual data objects 136) to the first data file (e.g., real-world data file 114 or virtual data file 134) as part of the data interaction 174, and a second user ID 172 of a second user 108 associated with the second data file (e.g., real-world data file 114 or virtual data file 134). Centralized server 112 and one or more computing nodes 104 of the decentralized network 130 may be configured to generate interaction logs 175 for data interactions conducted in the centralized network 110 and decentralized network 130 respectively. Interaction manager 170 may be configured to transmit at least a portion of the information from the interaction log 175 (along with the token ID 173 of the NFT associated with the IoT device) to the NFT blockchain network 150 (e.g., a computing node 104 of the NFT blockchain network 150). A computing node 104 of the NFT blockchain network 150 may be configured to access the NFT 154 associated with the IoT device 106 based on the token ID 173 and record the received information relating to the data interaction 174 in the NFT 154.

In some cases, the data interaction 174 initiated by the IoT device 106 may fail because of one or more reasons as described below. In such a case, interaction manager 170 may be configured to initiate and facilitate recording information relating to the failed data interaction 174 in the NFT 154 associated with the IoT device 106. Upon detecting that the data interaction 174 has failed, interaction manager 170 obtains an interaction log 175 associated with the failed data interaction 174. The interaction log 175 associated with the failed data interaction 174 includes information relating to the failed data interaction 174 including, but not limited to, a data interaction ID associated with the failed data interaction 174, the user ID associated with the user 108, the device ID 171 associated with the IoT device 106, an identity associated with a first data file (e.g., real-world data file 114 or virtual data file 134) associated with the device ID 171/user ID 173 that was to transfer data objects (e.g., real-world data objects 116 or virtual data objects 136) to a second data file (e.g., real-world data file 114 or virtual data file 134) or receive data objects (e.g., real-world data objects 116 or virtual data objects 136) from the second data file (e.g., real-world data file 114 or virtual data file 134) as part of the data interaction 174, an identity associated with a second data file (e.g., real-world data file 114 or virtual data file 134) that was to receive data objects (e.g., real-world data objects 116 or virtual data objects 136) from the first data file (e.g., real-world data file 114 or virtual data file 134) or transfer data objects (e.g., real-world data objects 116 or virtual data objects 136) to the first data file (e.g., real-world data file 114 or virtual data file 134) as part of the data interaction 174, and a second user ID 172 of a second user 108 associated with the second data file (e.g., real-world data file 114 or virtual data file 134). Centralized server 112 and one or more computing nodes 104 of the decentralized network 130 may be configured to generate interaction logs 175 for failed data interactions 174 conducted in the centralized network 110 and decentralized network 130 respectively. Interaction manager 170 may be configured to transmit at least a portion of the information from the interaction log 175 relating to the failed data interaction 174 (along with the token ID 173 of the NFT associated with the IoT device) to the NFT blockchain network 150 (e.g., a computing node 104 of the NFT blockchain network 150). A computing node 104 of the NFT blockchain network 150 may be configured to access the NFT 154 associated with the IoT device 106 based on the received token ID 173 and record the received information relating to the failed data interaction 174 in the NFT 154 associated with the IoT device 106.

Interaction manager 170 may be configured to generate a separate NFT 154 for the failed data interaction 174. For example, after obtaining the interaction log 175 associated with the failed data interaction 174, interaction manager 170 transmits a request to the minting server 152 of the NFT blockchain network 150 to generate an NFT 154 in relation to the failed data interaction 174. The request may include at least a portion of the information included in the interaction log 175 of the failed data interaction 174. Upon receiving the request from the interaction manager 170, the minting server 152 generates an NFT 154 in relation to the failed data interaction 174, wherein the generated NFT 154 includes at least a token ID 173 of the NFT 154, and the information associated with the failed data interaction 174 received from the interaction manager 170. Minting server 152 (or another computing node 104 of the NFT blockchain network 150) may be configured to transmit an indication to the interaction manager 170 that the NFT 154 has been generated in relation to the failed data interaction 174, wherein the indication includes the token ID 173 of the NFT 154. Interaction manager 170 may be configured to store (e.g., in a memory of the interaction manager 170) the token ID 173 of the NFT 154 mapped to one or more of the transaction ID of the failed data interaction 174, the device ID of the IoT device 106 that initiated/authorized the failed data interaction 174 and the user ID 172 of the user 108 who owns the IoT device 106.

In some cases, the failed data interaction 174 may be re-processed after applying a solution that resolves an error that caused failure of the data interaction 174. In such cases, interaction manager 170 may be configured to initiate/facilitate recording information related to the re-processed data interaction 174 in the NFT 154 associated with the IoT device 106 that initiated the data interaction and/or the NFT 154 separately generated for the failed data interaction 174. For example, when the re-processed data interaction 174 completes processing in the centralized network 110 or the decentralized network 130, interaction manager 170 obtains the token ID 173 of the NFT 154 associated with the IoT device 106 or the transaction ID of the failed data interaction 174. The interaction manager 170 may be configured to transmit a request to record the re-processed data interaction to a computing node 104 of the NFT blockchain network 150, wherein the request includes the token ID 173 along with one or more of a transaction ID associated with the re-processed data interaction and the solution applied to resolve the error associated with the failed data interaction. Upon receiving the request from the interaction manager 170, a computing node 104 of the NFT blockchain network 150 access the NFT 154 (stored in the blockchain of the NFT blockchain network 150) based on the received token ID 173 and stores the received transaction ID associated with the re-processed data interaction and the solution in the NFT 154.

FIG. 3 illustrates a flowchart of an example method 300 for selecting data interactions to be performed by an IoT device 106, in accordance with one or more embodiments of the present disclosure. Method 300 may be performed by the interaction manager 170 shown in FIG. 1.

At operation 302, interaction manager 170 records (e.g., in a memory of the interaction manager 170) a plurality of data interactions 174 conducted using a first user device (e.g., IoT device 106), wherein each data interaction 174 was initiated by the IoT device 106 and relates to transferring data objects (e.g., real-world data objects 116 or virtual data objects 136) from a first data file (e.g., real-world data file 114 or virtual data file 134) of a first user 108 in relation to an event 118/138 that occurred in a computing network (e.g., centralized network 110 or decentralized network 130).

As described above, interaction manager 170 may be configured to track data interactions 174 initiated/authorized by an IoT device 106 and suggest one or more data interactions 174 that may be performed in the future based on the previous data interactions 174. In this context, the IoT device 106 may be configured to perform one or more data interactions 174, wherein each of the one or more data interactions 174 may include transferring data objects (e.g., real-world data objects 116 or virtual data objects 136) from the data file (e.g., real-world data file 114 or virtual data file 134) of the user 108 to a second data file (e.g., real-world data file 114 or virtual data file 134) of a second user 108 or entity in relation to an event 118 that takes place in the centralized computing network 110 or an event 138 that takes place in the decentralized computing network 130. An event 118 or 138 may be associated with a product or service obtainable in the centralized network 110 or the decentralized network 130 respectively. The data interaction 174 in relation to the event 118/138 may include transferring data objects (e.g., real-world data objects 116 or virtual data objects 136) to obtain a product or service in the centralized network 110 or the decentralized network 130 respectively. For example, each product or service provided in the centralized network 110 or the decentralized network 130 may be obtained by a user 108 by transferring a pre-configured amount of respective real-world data objects 116 or virtual data objects 136 to a data file (e.g., real-world data file 114 or virtual data file 134) of a second user 108 or entity that provides the product or service in the respective network. A user 108 may perform a data interaction 174 in relation to an event 118/138 using an IoT device 106 (e.g., configure the IoT device 106 to perform the data interaction) or another computing node 104 of the user 108 (e.g., smartphone, tablet computer, laptop computer etc.).

Interaction manager 170 may be configured to record a plurality of data interactions conducted (e.g., initiated/authorized) using an IoT device 106 associated with the user 108 in relation to events 118 and 138 that occurred in the centralized network 110 and the decentralized network 130 respectively. Each recorded data interaction 174 may include transferring data objects (e.g., real-world data objects 116 or virtual data objects 136) from the data file (e.g., real-world data file 114 or virtual data file 134) of the user 108 to a second data file (e.g., real-world data file 114 or virtual data file 134) of a second user 108 or entity in relation to an event 118 that took place in the centralized computing network 110 or an event 138 that took place in the decentralized computing network 130.

At operation 304, interaction manager 170 determines a behavior log 176 associated with the first user 108, wherein the behavior log 176 stores events 118/138 associated with the plurality of data interactions 174 conducted using the IoT device 106. As described above, interaction manager 170 may be configured to determine a behavior log 176 associated with the user 108, wherein the behavior log 176 stores the events 118/138 associated with the plurality of data interactions conducted using the IoT device 106.

At operation 306, interaction manager 170 monitors the computing network (e.g., centralized network 110 or decentralized network 130) for future events 118/138 that are to occur in the computing network.

At operation 308, interaction manager 170 determines based on the monitoring that a first future event (e.g., future event 138) is to occur in the computing network (e.g., decentralized network 130).

As described above, interaction manager 170 may be configured to monitor future events 118/128 that are to occur in the respective centralized network 110 and the decentralized network 130, and determine based on the behavior log 176 whether the user 108 may be interested in obtaining a product or service associated with a future event 118/138. For example, based on monitoring future events 138 that are to occur in the decentralized network 130, interaction manager 170 may determine that a particular future event 138 is to occur in the decentralized network 130.

At operation 310, interaction manager 170 compares the first future event 138 with the behavior log 176 associated with the first user 108.

At operation 312, interaction manager 170 determines, based on the comparison, that a first data interaction 174 was previously conducted using the IoT device 106 in relation to a second event 138 that is associated with the first future event 138.

As described above, interaction manager 170 compares the particular future event 138 with the previous events 138 recorded in the behavior log 176 associated with the user 108. Based on this comparison, interaction manager 170 may determine that a data interaction 174 was previously conducted using the IoT device 106 in relation to a previous event 138 and that the previous event is associated with or related to the particular future event 138. For example, interaction manager 170 may determine that the previous event 138 from the behavior log 176 is related to or associated with the particular future event in response to detecting one or more of the previous event and the particular future event relate to the same event 138 (relate to obtaining the same product or service), the previous event and the particular future event are provided by the same user/entity, and the previous event and the particular future event takes place at the same date/time.

At operation 314, in response to determining that the first data interaction 174 was previously conducted using the IoT device 106 in relation to the second event 138 that is associated with the first future event 138, interaction manager 170 transmits an authorization request to a second user device (e.g., a computing node 104 of the user 108) associated with the first user 108 to conduct the first data interaction 174 in relation to the first future event 138.

As described above, in response to determining that the previous event 138 from the behavior log 176 is related to or associated with the particular future event 138 that is to occur in the decentralized network 130, interaction manager may transmit an authorization request to a computing node 104 of the user 108 to conduct a data interaction in relation to the future event. The computing node 104 of the user 108 may include, but is not limited to, a smartphone, a laptop computer, a tablet computer and a desktop computer. The authorization request may include information relating to the future event 138 such as a type of product or service related to the future event 138, an amount of virtual data objects 136 that are to be transferred to a target user/entity to obtain the product or service, and an identity of the target user/entity that is to receive the virtual data objects 136.

At operation 316, interaction manager 170 receives from the second user device an authorization to conduct the first data interaction 174 in relation to the first future event 138.

At operation 318, interaction manager 170 initiates the first data interaction 174 in relation to the first future event 138 using the IoT device 106.

As described above, upon receiving an authorization to conduct the data interaction in relation to the future event 138 from the computing node 104 of the user 108, interaction manager 170 initiates the data interaction in relation to the future event 138 using the IoT device 106 of the user 108 that is setup to conduct data interactions on behalf of the user 108. For example, interaction manager 170 may transmit an indication to the IoT device 106 that the data interaction relating to the future event 138 is authorized. The IoT device 106, in response to receiving the indication from the interaction manager 170, may initiate the data interaction in relation to the future event 138 including transferring a pre-configured amount of virtual data objects 136 from the virtual data file 134 of the user 108 to another virtual data file 134 of the target user/entity.

In one or more embodiments, when the data interaction in relation to the future event is successfully processed, interaction manager 170 may be configured to add the future event 138 to the behavior log 176 associated with the user 108.

Interaction manager 170 may be configured to train a machine learning model 177 based on the behavior log 176 associated with the user 108 to identify one or more future events 118/136 that are to occur in the respective network 110/130 that are associated with respective one or more previous events 118/136 from the behavior log 176.

FIG. 4 illustrates a flowchart of an example method 400 for processing data interactions performed by an IoT device 106, in accordance with one or more embodiments of the present disclosure. Method 400 may be performed by the interaction manager 170 shown in FIG. 1.

At operation 402, interaction manager 170 detects that a first data interaction 174 has been initiated by a first user device (e.g., IoT device 106).

At operation 404, interaction manager 170 determines whether the first data interaction 174 is to be processed in a first computing network (e.g., centralized network 110) or a second computing network (e.g., decentralized network 130). When the first data interaction 174 is to be performed in the centralized network 110, the first data interaction 174 includes transferring real-world data objects 116 from a first real-world data file 114 associated with the first user 108 that is stored in the centralized network 110. When the first data interaction 174 is to be performed in the decentralized network 130, the first data interaction 174 includes transferring virtual data objects 136 from a first virtual data file 134 associated with the first user 108 that is stored in the decentralized network 130.

As described above, interaction manager 170 may be configured to determine how a data interaction 174 initiated/authorized by an IoT device 106 is to be processed. In certain embodiments, interaction manager 170 may determine whether the data interaction 174 initiated/authorized by an IoT device 106 is to be processed in the centralized network 110 or the decentralized network 130. As described above, a data interaction 174 performed in the centralized network 110 may include transferring real-world data objects 116 from the real-world data file 114 associated with the user 108 to a second real-world data file 114 of a second user 108 or entity, in relation to obtaining a product or service provided in the centralized network 110. Similarly a data interaction 174 performed in the decentralized network 130 may include transferring virtual data objects 136 from the virtual data file 134 associated with the user 108 to a second virtual data file 134 of a second user 108 or entity, in relation to obtaining a product or service provided in the decentralized network 130.

Interaction manager 170 may determine whether the data interaction 174 initiated/authorized by an IoT device 106 is to be processed in the centralized network 110 or the decentralized network 130 based on one or more of several techniques.

In one embodiment, interaction manager 170 obtains a behavior log 176 associated with the user 108 who owns the IoT device 106, wherein the behavior log 176 includes a record of data interactions 174 conducted (e.g., initiated/authorized) using the IoT device 106 of the user 108. In response to detecting that the IoT device 106 has initiated/authorized a first data interaction 174, interaction manager 170 compares the first data interaction 174 with the data interactions 174 recorded in the behavior log 176. Based on this comparison, interaction manager 170 may determine that the first data interaction 174 initiated by the IoT device 106 is associated with a second data interaction 174 from the behavior log 176. In one example, interaction manager 170 may determine that the first data interaction 174 is associated with the second data interaction 174 in response to detecting one or more of the first and second data interactions relate to the same event (relate to obtaining the same product or service), the first and second data interactions include transferring data objects to the same target user/entity, and the first and second data interactions take place at the same date of the month, same day of the week, and/or same time of day.

In response to determining that the first data interaction 174 initiated by the IoT device 106 is associated with a second data interaction 174 from the behavior log 176, interaction manager 170 determines (e.g., from the behavior log 176 or from an interaction log associated with the second data interaction 174) whether the second data interaction 174 was processed in the centralized network 110 or the decentralized network 130. If the second data interaction 174 was detected as processed in the centralized network 110, interaction manager 170 determines that the first data interaction 174 is also to be processed in the centralized network 110. On the other hand, if the second data interaction 174 was detected as processed in the decentralized network 130, interaction manager 170 determines that the first data interaction 174 is also to be processed in the decentralized network 130.

If the first data interaction 174 is determined to be performed in the decentralized network 130, method 400 proceeds to operation 406 where interaction manager 170 processes the first data interaction 174 in the centralized network 110 by transferring the real-world data objects 116 from the first real-world data file 114 associated with the first user 108 to a second real-world data file 114. As described above, upon determining that the first data interaction 174 is to be performed in the centralized network 110, interaction manager 170 initiates processing of the first data interaction 174 in the centralized network 110. For example, interaction manager 170 transmits information relating to the first data interaction 174 (e.g., user id 172, identity of the real-world data file 114, an amount of real-world data objects 116 to be transferred, an identity of the target real-world data file 114 etc.) to the centralized server 112. The centralized server 112 may process the first data interaction 174 by transferring the real-world data objects 116 from the real-world data file 114 associated with the user 108 to the target real-world data file 114.

If the first data interaction 174 is determined to be performed in the decentralized network, method 400 proceeds to operation 408 where the interaction manager 170 processes the first data interaction 174 in the decentralized network 130 by transferring the virtual data objects 136 from the first virtual data file 134 associated with the first user 108 to a second virtual data file 134.

As described above, upon determining that the first data interaction 174 is to be performed in the decentralized network 130, interaction manager 170 initiates processing of the first data interaction 174 in the decentralized network 130. For example, interaction manager 170 transmits information relating to the first data interaction 174 (e.g., user id 172, identity of the virtual data file 134, an amount of virtual data objects 136 to be transferred, an identity of the target virtual data file 134 etc.) to a computing node 104 of the decentralized network 130. A computing node 104 of the decentralized network 130 may process the first data interaction 174 by transferring the virtual data objects 136 from the virtual data file 134 associated with the user 108 to the target virtual data file 134.

At operation 410, after processing the first data interaction 174, interaction manager 170 obtains an interaction log 175 associated with the first data interaction 174, wherein the interaction log 175 includes information related to the first data interaction 174.

As described above, interaction manager 170 may be configured to initiate and facilitate recording information relating to a data interaction 174 (e.g., initiated by the IoT device 106) in the NFT 154 associated with the IoT device 106. Once the data interaction 174 initiated by the IoT device 106 has been processed (e.g., in the centralized network 110 or the decentralized network 130), interaction manager 170 may be configured to obtain an interaction log 175 associated with the data interaction 174, wherein the interaction log 175 includes information related to the data interaction 174 including, but not limited to, a data interaction ID associated with the data interaction 174, the user ID 172 associated with the user 108 who owns the IoT device 106, the device ID 171 associated with the IoT device 106, an identity associated with a first data file (e.g., real-world data file 114 or virtual data file 134) associated with the device ID 171/user ID 172 that transferred data objects (e.g., real-world data objects 116 or virtual data objects 136) to a second data file (e.g., real-world data file 114 or virtual data file 134) or received data objects (e.g., real-world data objects 116 or virtual data objects 136) from the second data file (e.g., real-world data file 114 or virtual data file 134) as part of the data interaction 174, an identity associated with a second data file (e.g., real-world data file 114 or virtual data file 134) that received data objects (e.g., real-world data objects 116 or virtual data objects 136) from the first data file (e.g., real-world data file 114 or virtual data file 134) or transferred data objects (e.g., real-world data objects 116 or virtual data objects 136) to the first data file (e.g., real-world data file 114 or virtual data file 134) as part of the data interaction 174, and a second user ID 172 of a second user 108 associated with the second data file (e.g., real-world data file 114 or virtual data file 134). Centralized server 112 and one or more computing nodes 104 of the decentralized network 130 may be configured to generate interaction logs 175 for data interactions conducted in the centralized network 110 and decentralized network 130 respectively.

At operation 412, interaction manager 170 extracts the information related to the first data interaction 174 from the interaction log 175.

At operation 414, interaction manager 170 transmits the information associated with the first data interaction 174 to the NFT blockchain network 150 for recording in a first NFT 154 associated with the IoT device 106.

As described above, interaction manager 170 may be configured to transmit at least a portion of the information from the interaction log 175 (along with the token ID 173 of the NFT associated with the IoT device) to the NFT blockchain network 150 (e.g., a computing node 104 of the NFT blockchain network 150). A computing node 104 of the NFT blockchain network 150 may be configured to access the NFT 154 associated with the IoT device 106 based on the token ID 173 and record the received information relating to the data interaction 174 in the NFT 154.

In certain embodiments, the decentralized network 130 may support processing of data interactions 174 in the decentralized network 130 using several types of virtual data objects 136. Upon determining that the first data interaction 174 is to be performed in the decentralized network 130, interaction manager 170 may be configured to determine which one of the several types of virtual data objects 136 is to be used (e.g., transferred to the target user/entity) when processing the first data interaction 174 in the decentralized network 130. Generally, processing a data interaction in the decentralized network 130 using a particular type of virtual data objects 136 is associated with transferring a supplementary amount of the particular type of virtual data objects 136 to a processing server in the decentralized network 130 configured to process data interactions using the particular type of virtual data objects 136. This supplementary amount of the virtual data objects 136 is in addition to the preconfigured amount of virtual data objects 136 that are to be transferred to the target entity as part of processing the data interaction. Processing the same data interaction 174 using different types of virtual data objects 136 may involve transferring different supplementary amounts of the respective types of virtual data objects 136 to respective processing servers.

For example, the decentralized network 130 may support processing of data interactions 174 in the decentralized network 130 using a first type of virtual data objects 136 and a second type of virtual data objects 136. Interaction manager 170 may determine that, when using the virtual data objects of the first type during processing of the first data interaction 174, a first supplementary amount of the virtual data objects 136 of the first type is to be transferred to a first processing server in the decentralized network 130. The interaction manager 170 may additionally determine that, when using the virtual data objects 136 of the second type during processing of the first data interaction 174, a second supplementary amount of virtual data objects 136 of the second type is to be transferred to a second processing server in the decentralized network 130. The interaction manager 170 may additionally determine that the first supplementary amount of virtual data objects of the first type is less than the second supplementary amount of the virtual data objects of the second type needed to process the first data interaction. In response, to determining that a lesser supplementary amount of the virtual data objects of the first type is needed to process the first data interaction 174, interaction manager 170 may determine to process the first data interaction 174 using the virtual data objects of the first type. In this context, the interaction manager 170 may transmit an indication to the first processing server of the decentralized network to process the first data interaction using virtual data objects of the first type. In response to receiving the indication, the first processing server may process the first data interaction 174 by transferring the pre-configured amount of virtual data objects of the first type from the virtual data file 134 of the user 108 to the target virtual data file and transferring the first supplementary amount of virtual data objects of the first type to the first processing server.

In an additional or alternative embodiment, when multiple data interactions 174 are initiated simultaneously or very close in time by one or more IoT devices 106 associated with a user 108, interaction manager 170 may be configured to prioritize processing of certain data interactions 174 over others based on a priority associated with each data interaction 174. Interaction manager 170 may be configured to determine a priority associated with each data interaction 174 initiated by an IoT device 106 in real-time based on a type of the data interaction 174. For example, when a data interaction 174 is in relation to obtaining a product or service associated with a time deadline, interaction manager 170 may assign a higher priority to this data interaction 174 over other data interactions 174. In another example, when a requested data interaction 174 is to be performed in the decentralized network 130 using a particular type of virtual data objects 136 and a time window to process the data interaction 174 with minimal or reasonable supplementary amount of the virtual data objects 136 is approaching, interaction manager 170 assigns a higher priority to the data interaction 174 over other data interactions. In another example, each data interaction may be associated with a user assigned priority level. Interaction manager 170 may prioritize the data interactions 174 based on the user assigned priority levels associated with the data interactions 174, by assigning a higher priority to a data interaction 174 that is associated with a higher user assigned priority level. Interaction manager 170 may be configured to process or trigger processing of the data interactions 174 in the order of their assigned priorities, wherein data interactions 174 having higher assigned priorities are processed before data interactions 174 having lower assigned priorities.

FIG. 5 illustrates a flowchart of an example method 500 for resolving failed data interactions performed by an IoT device 106, in accordance with one or more embodiments of the present disclosure. Method 500 may be performed by the interaction manager 170 shown in FIG. 1.

At operation 502, interaction manager 170 detects a first failure incident 178 associated with a failure of a data interaction 174 relating to a transfer initiated by a user device (e.g., IoT device 106) of data objects (e.g., real-world data objects 116 or virtual data objects 136) from a source data file (e.g., real-world data file 114 or virtual data file 134) associated with the IoT device 106 to a target data file (e.g., real-world data file 114 or virtual data file 134).

As described above, interaction manager 170 may be configured to resolve failure incidents 178 associated with failed data interactions 174 that were initiated by an IoT device 106. A failure incident 178 may refer to a failure of a data interaction 174 relating to a transfer initiated by an IoT device 106 associated with a user 108 of data objects (e.g., real-world data objects 116 or virtual data objects 136) from a source data file (e.g., real-world data file 114 or virtual data file 134) associated with the IoT device 106/user 108 to a target data file (e.g., real-world data file 114 or virtual data file 134). As described above, an IoT device 106 may initiate/authorize the transfer of the data objects to obtain a product or service in the respective centralized network 110 or decentralized network 130.

At operation 504, interaction manager 170 obtains a first interaction log 175 associated with the data interaction 174, wherein the first interaction log 175 includes a context associated with the first failure incident 178.

As described above, when the interaction manager 170 detects a first failure incident 178 associated with a failure of a data interaction 174 relating to a transfer initiated by an IoT device 106 of data objects (e.g., real-world data objects 116 or virtual data objects 136) from a source data file (e.g., real-world data file 114 or virtual data file 134) associated with the IoT device 106/user 108 to a target data file (e.g., real-world data file 114 or virtual data file 134), interaction manager 170 first obtains a first interaction log 175 associated with the failed data interaction 174. The interaction log 175 associated with the failure incident 178 is a log of the failed data interaction 174 in the centralized network 110 or the decentralized network 130.

At operation 506, interaction manager 170 compares the first interaction log 175 with a plurality of second interaction logs 175 associated with a plurality of known failure incidents 181. As described above, interaction manager 170 stores an interaction log 175 associated with each known failure incident 181, wherein the interaction log 175 associated with a known failure incident 181 is a log of a failed data interaction 174 in the centralized network 110 or the decentralized network 130. Interaction manager 170 may be configured to compare the first interaction log 175 with a plurality of second interaction logs 175 associated with the plurality of known failure incidents 181 stored at the interaction manager 170.

At operation 508, interaction manager 170 determines a correlation probability 187 based on the comparison of the first interaction log 175 and the plurality of second interaction logs 175, wherein the correlation probability 187 indicates a degree of similarity between contexts associated with the first interaction log 175 and at least a portion of the second interaction logs 175.

As described above, based on the comparison of the first interaction log 175 with the plurality of second interaction logs 175, interaction manager 170 may be configured to determine a correlation probability 187, wherein the correlation probability 187 indicates a degree of similarity between contexts associated with the first interaction log 175 and at least a portion of the second interaction logs 175. In one embodiment, to determine the correlation probability 187, interaction manager 170 may be configured to determine a first interaction context based on the first interaction log 175 associated with the first failure incident 178, wherein the first interaction context comprises the context associated with the first failure incident 178. A context associated with a failure incident 178 includes one or more reasons or errors that caused the failure incident 178 and/or conditions prevailing at the time the data interaction failed. Interaction manager 170 additionally determines second interaction contexts based on the plurality of second interaction logs 175, wherein each second interaction context comprises a context associated with a respective second interaction log 175. Interaction manager 170 may be configured to compare the first interaction context associated with the first interaction log 175 with each of the second interaction contexts associated with the second interaction logs 175 to determine the correlation probability 187.

At operation 510, interaction manager 170 determines whether the correlation probability 187 equals or exceeds a threshold probability 188. If the correlation probability 187 does not equal or exceed the threshold probability 188, method 500 proceeds to operation 512, where the interaction manager 170 generates an error notification for manual resolution of the failed data interaction 174. On the other hand, if the correlation probability 187 equals or exceeds the threshold probability 188, method 500 proceeds to operation 514.

At operation 514, interaction manager 170 selects a first known failure incident 181 that is associated with the first failure incident 178, wherein the first known failure incident 181 is determined from a portion of the plurality of known failure incidents 181 that are associated with the portion of the second interaction logs 175.

At operation 516, interaction manager 170 obtains a first known solution 186 that corresponds to the first known failure incident 181.

As described above, interaction manager 170 may store a plurality of known failure incidents 181 and a known solution 186 corresponding to each known failure incident 181, wherein each known failure incident 181 corresponds to a failure of a previous data interaction 174 conducted in the centralized network 110 or the decentralized network 130. A known solution 186 corresponding to a known failure incident 181 is a solution that was applied to resolve one or more errors that caused the known failure incident 181.

Interaction manager 170 may be configured to determine a plurality of known failure clusters 182 based on the known failure incidents 181, wherein each known failure cluster 182 corresponds to a failure type of a plurality of failure types. In other words, interaction manager 170 classifies the known failure incidents 181 stored at the interaction manager 170 by a type of failure associated with the known failure incidents 181, such that all known failure incidents 181 that correspond to a particular type of failure are assigned to the same known failure cluster 182. In one example, a type of failure may include failure of a data interaction 174 due to errors in a hardware or software component of the centralized or decentralized network. In this example, all known failure incidents 181 in which the data interactions 174 failed because of one or more errors in software and/or hardware components are assigned to the same known failure cluster 182. In another example, a type of failure may include failure of a data interaction 174 due to insufficient data objects (e.g., real-world data objects 116 or virtual data objects 136) in the respective data file (e.g., real-world data file 114 or virtual data file 134). In this example, all known failure incidents 181 in which the data interactions 174 failed because of insufficient data objects (e.g., real-world data objects 116 or virtual data objects 136) in the respective data file (e.g., real-world data file 114 or virtual data file 134) are assigned to the same known failure cluster 182.

Interaction manager 170 may be configured to further classify known failure incidents 181 in each known failure cluster 182 based on incident patterns 183 associated with the known failure incidents 181. For example, interaction manager 170 may be configured determine an incident pattern 189 for each known failure incident 181 in a known failure cluster 182. Determining a known incident pattern 183 for a known failure incident 181 may include determining one or more of a known failure pattern 184 and a known behavioral pattern 185 corresponding to the known failure incident 181. The known failure pattern 184 includes at least one known cause of failure associated with the respective known failure incident 181, and the known behavioral pattern 185 includes at least one parameter indicating a known behavior of at least one user 108 associated with the known incident pattern 183. Each known incident pattern 183 assigned to a known failure incident 181 corresponds to a unique known failure pattern 184, a unique known behavioral pattern 185 or a combination thereof associated with the known failure incident 181. A known failure incident 181 is assigned a different incident pattern 183 if the known failure incident 181 is associated with at least one of a different known failure pattern 184 or a different known behavioral pattern 185. A known failure cluster 182 of known failure incidents 181 may include several sub-clusters of known failure incidents 181, wherein each sub-cluster of known failure incidents 181 corresponds to a different known incident pattern 183. For example, when a known failure cluster 182 corresponds to failed data interactions 174 because of errors in a hardware or software component, each known failure incident 181 in this known failure cluster 182 may be assigned a different known incident pattern 183 based on a known failure pattern 184 associated with the known failure incident 181. In this example, a known failure pattern 184 may include, but is not limited to, one or more of failure of a processing server (e.g., centralized server 112 in centralized network 110 or decentralized network), failure of a network router, failure of a network gateway, and failure or errors in the IoT device 106 that initiated the failed data interaction 174. In another example, when a known failure cluster 182 corresponds to failed data interactions 174 because of insufficient data objects (e.g., real-world data objects 116 or virtual data objects 136) in the respective data file (e.g., real-world data file 114 or virtual data file 134), each known failure incident 181 in this known failure cluster 182 may be assigned a different known incident pattern 183 based on a known failure pattern 184 and/or a known behavioral pattern 185 associated with the known failure incident 181. In this example, a known failure pattern 184 may include, but is not limited to, one or more of insufficient data objects due to automatic transfer of data objects from the data file, insufficient data objects due to unintentional transfer of data objects from the data file, insufficient data objects due to theft of data objects from the data file, and insufficient data objects due to a failed transfer of data objects to the data file. In this example, a known behavioral pattern 185 of a user 108 associated with a known incident pattern 183 may include, but is not limited to, automatic and periodic transfer of a pre-configured amount of data objects into the data file of the user 108, other data files of the user 108 registered for data interactions, a high confidence indicator associated with the user 108 etc.

When the determined correlation probability 187 equals or exceeds a threshold probability 188, interaction manager 170 determines a known failure cluster 182 corresponding to the first failure incident 178. To determine a known failure cluster 182 corresponding to the first failure incident 178, interaction manager 170 determines a first failure type associated with the first failure incident 178 and determines a known failure cluster 182 that corresponds to the first failure type. For example, when the first failure type corresponds to a failure of the data interaction 174 due to errors in a hardware or software component of the centralized or decentralized network, interaction manager 170 determines the known failure cluster 182 that includes known failure incidents 181 in which data interactions 174 failed because of errors in a hardware or software component of the centralized or decentralized network.

Once a known failure cluster 182 corresponding to the first failure incident 178 is determined, interaction manager 170 may be configured to determine a known incident pattern 183 of a known failure incident 181 in the determined known failure cluster 182 that corresponds to the first failure incident 178. To determine a known incident pattern

183, interaction manager 170 determines a first incident pattern 189 associated with the first failure incident 181. Determining the first incident pattern 189 may include determining a first failure pattern 179 associated with the first failure incident 178, wherein the first failure pattern 179 includes a cause of failure associated with the first failure incident 178. Determining the first incident pattern 189 may additionally include determining a first behavioral pattern 180 associated with the first failure incident 178 including at least one parameter indicating a behavior of the user 108 associated with the source data file from which data objects are to be transferred/IoT device 106 that initiated the data interaction 174 associated with the first failure incident 178. For each known incident pattern 183 corresponding to a known failure incident 181 in the determined known failure cluster 182, interaction manager 170 compares the first failure pattern 179 with a known failure pattern 184 associated with the known incident pattern 183. In an additional or alternative embodiment, for each known incident pattern 183 corresponding to the known failure incident 181 in the determined known failure cluster 182, interaction manager 170 compares the first behavioral pattern 180 with a known behavioral pattern 185 associated with the known incident pattern 183. Based on the comparison of the failure patterns and/or the behavioral patterns, interaction manager 170 may determine a known incident pattern 183 that matches with the first incident pattern 189 associated with the first failure incident 178.

Once a known incident pattern 183 corresponding to the first failure incident 178 has been determined, interaction manager 170 may be configured to obtain (e.g., from the memory of the interaction manager 170) a known solution 186 that corresponds to the known failure incident 181 associated with the matching known incident pattern 183.

At operation 518, interaction manager 170 processes the data interaction 174 based on the first known solution 186 by performing at least one corrective action specified in the first known solution 186. As described above, Interaction manager 170 may be configured to re-process (e.g., trigger processing) the failed data interaction 174 associated with the first failure incident 178 based on the determined known solution, for example, by performing at least one corrective action specified in the determined known solution.

FIG. 6 illustrates an example schematic diagram 600 of the interaction manager 170 shown in FIG. 1, in accordance with one or more aspects of the present disclosure.

The interaction manager 170 comprises a processor 602, a memory 606, and a network interface 604. The interaction manager 170 may be configured as shown in FIG. 6 or in any other suitable configuration.

The processor 602 comprises one or more processors operably coupled to the memory 606. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., interaction manager instructions 608) to implement the interaction manager 170. In this way, processor 602 may be a special-purpose computer designed to implement the functions disclosed herein. In one or more embodiments, the interaction manager 170 is implemented using logic units, FPGAs, ASICs, DSPs, or any other suitable hardware. The interaction manager 170 is configured to operate as described with reference to FIGS. 2-5. For example, the processor 602 may be configured to perform at least a portion of the methods 200, 300, 400 and 500 as described in FIGS. 2-5 respectively.

The memory 606 comprises one or more disks, tape drives, or solid-state drives, and may be used as an over-flow data storage device, to store programs when such programs are selected for execution, and to store instructions and data that are read during program execution. The memory 606 may be volatile or non-volatile and may comprise a read-only memory (ROM), random-access memory (RAM), ternary content-addressable memory (TCAM), dynamic random-access memory (DRAM), and static random-access memory (SRAM).

The memory 606 is operable to store device IDs 171, user IDs 172, token IDs 173, data interactions 174, interaction logs 175, behavior log 176, machine learning model 177, failure incidents 178, incident patterns 189, failure patterns 179, behavioral patterns 180, known failure incidents 181, known failure clusters 182, known incident patterns 183, known failure patterns 184, known behavioral patterns 185, known solutions 186, correlation probability 187, threshold probability 188, and the interaction manager instructions 608. The interaction manager instructions 608 may include any suitable set of instructions, logic, rules, or code operable to execute the interaction manager 170.

The network interface 604 is configured to enable wired and/or wireless communications. The network interface 604 is configured to communicate data between the interaction manager 170 and other devices, systems, or domains (e.g. computing nodes 104 (including IoT devices 106), one or more computing nodes 104 of the centralized server 112 including the centralized server 112, one or more computing nodes of the decentralized network 130 including the decentralized server 132, one or more other computing nodes 104 of the NFT blockchain network 150 including the minting server 152 etc.). For example, the network interface 604 may comprise a Wi-Fi interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

It may be noted that each of the computing nodes 104, centralized server 112, decentralized server 132 and the minting server 152 may be implemented like the interaction manager 170 shown in FIG. 6. For example, each of the computing nodes 104, centralized server 112, decentralized server 132 and the minting server 152 may have a respective processor and a memory that stores data and instructions to perform operations discussed above.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a non-fungible token (NFT) blockchain network configured to generate and store NFTs;
a first computing network;
a blockchain network;
a smart home appliance associated with a first user, wherein the smart home appliance performs data interactions associated with the first user without intervention from the first user;
a memory that stores the data interactions performed using the smart home appliance; and
a hardware processor communicatively coupled to the NFT blockchain network, the first computing network, the blockchain network, the smart home appliance and the memory, wherein the hardware processor:
detects that a first data interaction has been initiated by the smart home appliance;
determines whether the first data interaction is associated with the first computing network or the blockchain network, wherein:
when the first data interaction is associated with the first computing network, the first data interaction comprises transferring real-world data objects from a first real-world account associated with the first user that is stored in the first computing network;
when the first data interaction is associated with the blockchain network, the first data interaction comprises transferring virtual data objects from a first crypto wallet associated with the first user that is stored in the blockchain network;
in response to determining that the first data interaction is associated with the first computing network, process the first data interaction in the first computing network by transferring the real-world data objects from the first real-world account associated with the first user to a second real-world account;
in response to determining that the first data interaction is associated with the blockchain network, determine that the virtual data objects that are transferred during processing of the first data interaction are of a first type or a second type, wherein the virtual data objects are a first amount of virtual data objects;
determine that when using the virtual data objects of the first type during processing of the first data interaction, a first supplementary amount of virtual data objects of the first type are transferred to a first processing server in the blockchain network to process the first data interaction in the blockchain network, wherein the first supplementary amount of virtual data objects is in addition to the first amount of virtual data objects that are transferred during processing of the first data interaction;
process the first data interaction in the blockchain network by transferring the first amount of virtual data objects from the first crypto wallet associated with the first user to a second crypto wallet;
transfer the first supplementary amount of virtual data objects of the first type to the first processing server;
after processing the first data interaction, obtain an interaction log associated with the first data interaction, wherein the interaction log comprises information related to the first data interaction, the information comprising one or more of:
a data interaction ID associated with the first data interaction;
a first user ID associated with the first user;
a first device ID associated with the smart home appliance; and
an identity associated with the first real-world account or the first crypto wallet;
extracts the information related to the first data interaction from the interaction log;
transmits the information associated with the first data interaction to the NFT blockchain network for recording in a first NFT associated with the smart home appliance;
detect that a second data interaction has been initiated by the smart home appliance in the first computing network;
determine when using the virtual data objects of the first type during processing of the first data interaction in the blockchain network, a first time period associated with processing the first data interaction with the first supplementary amount of virtual data objects;
assign a higher priority to the first data interaction and assign a lower priority to the second data interaction based on the first time period associated with processing the first data interaction; and
in response to assigning the higher priority to the first data interaction and assigning the lower priority to the second data interaction, determine to process the first data interaction before processing the second data interaction.

2. The system of claim 1, wherein the hardware processor determines whether the first data interaction is associated with the first computing network or the blockchain network by:

obtaining a behavior log associated with the first user, wherein the behavior log stores the data interactions conducted using the smart home appliance;

determining that a third data interaction from the behavior log is associated with the first data interaction;

determining based on the behavior log, the third data interaction was performed in the first computing network; and in response to determining that the third data interaction was performed in the first computing network, determining to process the first data interaction in the first computing network.

3. The system of claim 1, wherein the hardware processor determines whether the first data interaction associated with the first computing network or the blockchain network by:

obtaining a behavior log associated with the first user, wherein the behavior log stores the data interactions conducted using the smart home appliance;

determining that a third data interaction from the behavior log is associated with the first data interaction;

determining based on the behavior log, the third data interaction was performed in the blockchain network; and in response to determining that the third data interaction was performed in the blockchain network, determining to process the first data interaction in the blockchain network.

4. The system of claim 1, wherein the hardware processor further:

determines that the first data interaction is associated with the blockchain network;

determines that when using the virtual data objects of the second type during processing of the first data interaction, a second amount of virtual data objects of the second type are transferred to a second processing server in the blockchain network to process the first data interaction in the blockchain network, wherein the first amount is less than the second amount; and in response to determining that the first amount is less than the second amount, selects the first type of virtual data objects for processing the first data interaction.

5. The system of claim 1, wherein the hardware processor further:

detects that a third data interaction has been initiated by the smart home appliance;

determines that a higher priority is associated with the first data interaction; and in response, determines to process the first data interaction before processing the third data interaction.

6. The system of claim 1, wherein the hardware processor further:

in response to detecting that the first data interaction has been initiated by the smart home appliance, obtains a token ID of the first NFT associated with the smart home appliance;

requests from the NFT blockchain network based on the token ID of the first NFT, verification of the smart home appliance based on the first NFT;

receives from the NFT blockchain network and in response to the request for verification, an indication that the smart home appliance is verified; and in response to receiving the indication, processes the first data interaction.

7. The system of claim 1, wherein:

the first computing network comprises a centralized computing network, wherein data interactions performed in the centralized computing network are managed by a central computing entity.

8. The system of claim 7, wherein the data interactions performed in the blockchain network are collectively managed by a plurality of computing entities connected to the blockchain network.

9. A method for processing data interactions, comprising:

detecting that a first data interaction has been initiated by a smart home appliance associated with a first user, wherein the smart home appliance is configured to perform data interactions associated with the first user without intervention from the first user;

determining whether the first data interaction is associated with a first computing network or a blockchain network, wherein:

when the first data interaction is associated with the first computing network, the first data interaction comprises transferring real-world data objects from a first real-world account associated with the first user that is stored in the first computing network; and when the first data interaction is associated with the blockchain network, the first data interaction comprises transferring virtual data objects from a first crypto wallet associated with the first user that is stored in the blockchain network;

in response to determining that the first data interaction is associated with the first computing network, processing the first data interaction in the first computing network by transferring the real-world data objects from the first real-world account associated with the first user to a second real-world account;

in response to determining that the first data interaction is associated with the blockchain network, determining that the virtual data objects that are transferred during processing of the first data interaction are of a first type or a second type, wherein the virtual data objects are a first amount of virtual data objects;

determining that when using the virtual data objects of the first type during processing of the first data interaction, a first supplementary amount of virtual data objects of the first type are transferred to a first processing server in the blockchain network to process the first data interaction in the blockchain network, wherein the first supplementary amount of virtual data objects is in addition to the first amount of virtual data objects that are transferred during processing of the first data interaction;

processing the first data interaction in the blockchain network by transferring the first amount of virtual data objects from the first crypto wallet associated with the first user to a second crypto wallet;

transferring the first supplementary amount of virtual data objects of the first type to the first processing server;

after processing the first data interaction, obtaining an interaction log associated with the first data interaction, wherein the interaction log comprises information related to the first data interaction, the information comprising one or more of:

a data interaction ID associated with the first data interaction;

a first user ID associated with the first user;

a first device ID associated with the smart home appliance; and an identity associated with the first real-world account or the first crypto wallet;

extracting the information related to the first data inter-
action from the interaction log;
transmitting the information associated with the first
data interaction to a non-fungible token (NFT)
blockchain network for recording in a first NFT
associated with the smart home appliance;
detecting that a second data interaction has been initiated
by the smart home appliance in the first computing
network;
determining when using the virtual data objects of the first
type during processing of the first data interaction in the
blockchain network, a first time period associated with
processing the first data interaction with the first
supplementary amount of virtual data objects;
assigning a higher priority to the first data interaction and
assigning a lower priority to the second data interaction
based on the first time period associated with process-
ing the first data interaction; and
in response to assigning the higher priority to the first data
interaction and assigning the lower priority to the
second data interaction, determining to process the first
data interaction before processing the second data
interaction.

10. The method of claim 9, wherein determining whether
the first data interaction associated with the first computing
network or the blockchain network comprises:
obtaining a behavior log associated with the first user,
wherein the behavior log stores the data interactions
conducted using the smart home appliance;
determining that a third data interaction from the behavior log is associated with the first data interaction;
determining based on the behavior log, the third data
interaction was performed in the first computing net-
work; and
in response to determining that the third data interaction
was performed in the first computing network, deter-
mining to process the first data interaction in the first
computing network.

11. The method of claim 9, wherein determining whether
the first data interaction is associated with the first computing network or the blockchain network comprises:
obtaining a behavior log associated with the first user,
wherein the behavior log stores the data interactions
conducted using the smart home appliance;
determining that a third data interaction from the behavior log is associated with the first data interaction;
determining based on the behavior log, the third data
interaction was performed in the blockchain network;
and
in response to determining that the third data interaction
was performed in the blockchain network, determining
to process the first data interaction in the blockchain
network.

12. The method of claim 9, further comprising:
determining that the first data interaction associated with the blockchain network;
determining that when using the virtual data objects of the
second type during processing of the first data interac-
tion, a second amount of virtual data objects of the
second type are transferred to a second processing
server in the blockchain network to process the first
data interaction in the blockchain network, wherein the
first amount is less than the second amount; and
in response to determining that the first amount is less
than the second amount, selecting the first type of
virtual data objects for processing the first data inter-
action.

13. The method of claim 9, further comprising:
detecting that a third data interaction has been initiated by
the smart home appliance;
determining that a higher priority is associated with the
first data interaction; and
in response, determine to process the first data interaction
before processing the third interaction.

14. The method of claim 9, further comprising:
in response to detecting that the first data interaction has
been initiated by the smart home appliance, obtaining
a token ID of the first NFT associated with the smart
home appliance;
requesting from the NFT blockchain network based on the
token ID of the first NFT, verification of the smart home
appliance based on the first NFT;
receiving from the NFT blockchain network and in
response to the request for verification, an indication
that the smart home appliance is verified; and
in response to receiving the indication, processing the first
data interaction.

15. The method of claim 9, wherein the first computing
network comprises a centralized computing network,
wherein data interactions performed in the centralized com-
puting network are managed by a central computing entity.

16. The method of claim 9,
wherein data interactions performed in the blockchain
network are collectively managed by a plurality of
computing entities connected to the blockchain net-
work.

17. A non-transitory computer-readable medium for per-
forming data interactions, wherein the non-transitory com-
puter-readable medium stores instructions which when
executed by a hardware processor cause the hardware pro-
cessor to:
detect that a first data interaction has been initiated by a
smart home appliance associated with a first user,
wherein the smart home appliance is configured to
perform data interactions associated with the first user
without intervention from the first user;
determine whether the first data interaction is associated
with a first computing network or a blockchain net-
work, wherein:
when the first data interaction is associated with the
first computing network, the first data interaction
comprises transferring real-world data objects from a
first real-world account associated with the first user
that is stored in the first computing network; and
when the first data interaction is associated with the
blockchain network, the first data interaction com-
prises transferring virtual data objects from a first
crypto wallet associated with the first user that is
stored in the blockchain network;
in response to determining that the first data interaction is
associated with the first computing network, process
the first data interaction in the first computing network
by transferring the real-world data objects from the first
real-world account associated with the first user to a
second real-world account;
in response to determining that the first data interaction is
associated with the blockchain network, determine that
the virtual data objects that are transferred during
processing of the first data interaction are of a first type
or a second type, wherein the virtual data objects are a
first amount of virtual data objects;
determine that when using the virtual data objects of the
first type during processing of the first data interaction,
a first supplementary amount of virtual data objects of the first type are transferred to a first processing server in the blockchain network to process the first data interaction in the blockchain network, wherein the first supplementary amount of virtual data objects is in addition to the first amount of virtual data objects that are transferred during processing of the first data interaction;

process the first data interaction in the blockchain network by transferring the first amount of virtual data objects from the first crypto wallet associated with the first user to a second crypto wallet;

transfer the first supplementary amount of virtual data objects of the first type to the first processing server;

after processing the first data interaction, obtain an interaction log associated with the first data interaction, wherein the interaction log comprises information related to the first data interaction, the information comprising one or more of:

a data interaction ID associated with the first data interaction;

a first user ID associated with the first user;

a first device ID associated with the smart home appliance; and an identity associated with the first real-world account or the first crypto wallet;

extract the information related to the first data interaction from the interaction log;

transmit the information associated with the first data interaction to a non-fungible token (NFT) blockchain network for recording in a first NFT associated with the smart home appliance;

detect that a second data interaction has been initiated by the smart home appliance in the first computing network;

determine when using the virtual data objects of the first type during processing of the first data interaction in the blockchain network, a first time period associated with processing the first data interaction with the first supplementary amount of virtual data objects;

assign a higher priority to the first data interaction and assign a lower priority to the second data interaction based on the first time period associated with processing the first data interaction; and in response to assigning the higher priority to the first data interaction and assigning the lower priority to the second data interaction, determine to process the first data interaction before processing the second data interaction.

18. The non-transitory computer-readable medium of claim 17, wherein determining whether the first data interaction is associated with the first computing network or the blockchain network comprises:

obtaining a behavior log associated with the first user, wherein the behavior log stores the data interactions conducted using the smart home appliance;

determining that a third data interaction from the behavior log is associated with the first data interaction;

determining based on the behavior log, the third data interaction was performed in the first computing network; and in response to determining that the third data interaction was performed in the first computing network, determining to process the first data interaction in the first computing network.

19. The non-transitory computer-readable medium of claim 17, wherein determining whether the first data interaction is associated with the first computing network or the blockchain network comprises:

obtaining a behavior log associated with the first user, wherein the behavior log stores the data interactions conducted using the smart home appliance;

determining that a third data interaction from the behavior log is associated with the first data interaction;

determining based on the behavior log, the third data interaction was performed in the blockchain network; and in response to determining that the third data interaction was performed in the blockchain network, determining to process the first data interaction in the blockchain network.

20. The non-transitory computer-readable medium of claim 17, wherein the instructions further cause the hardware processor to:

determine that the first data interaction is associated with the blockchain network;

determine that when using the virtual data objects of the second type during processing of the first data interaction, a second amount of virtual data objects of the second type are transferred to a second processing server in the blockchain network to process the first data interaction in the blockchain network, wherein the first amount is less than the second amount; and in response to determining that the first amount is less than the second amount, select the first type of virtual data objects for processing the first data interaction.

\* \* \* \* \*